United States Patent [19]

Yoshida et al.

[11] Patent Number: 5,008,764
[45] Date of Patent: * Apr. 16, 1991

[54] ROTARY HEAD TYPE DIGITAL SIGNAL REPRODUCING APPARATUS WITH SLOW TAPE SPEED MODE AND IMPROVED TRACKING CONTROL

[75] Inventors: Shiro Yoshida, Maebashi; Yasuhiro Yamada, Yokosuka; Shoji Ueno, Zama, all of Japan

[73] Assignee: Victor Company of Japan, Ltd., Kanagawa, Japan

[*] Notice: The portion of the term of this patent subsequent to Jun. 13, 2006 has been disclaimed.

[21] Appl. No.: 168,700

[22] Filed: Mar. 16, 1988

Related U.S. Application Data

[63] Continuation-in-part of Ser. No. 91,085, Aug. 31, 1987, Pat. No. 4,839,755.

[30] Foreign Application Priority Data

Sep. 5, 1986 [JP] Japan .................... 61-209243
Oct. 2, 1986 [JP] Japan .................... 61-234961
Mar. 18, 1987 [JP] Japan .................... 62-63505

[51] Int. Cl.⁵ .............. G11B 5/584; G11B 15/467
[52] U.S. Cl. .................. 360/77.15; 360/32; 360/70; 360/73.05; 360/77.14
[58] Field of Search ............ 360/9.1–10.3, 360/18, 19.1, 70, 73.13, 77.14, 77.15, 32, 8, 75, 73.05; 371/38

[56] References Cited

U.S. PATENT DOCUMENTS 4,755,893 7/1988 Yamada et al. ............ 360/77.15
4,839,755 6/1989 Yamada et al. ............ 360/32

FOREIGN PATENT DOCUMENTS 0171266 2/1986 European Pat. Off. .

*Primary Examiner*—Alan Faber
*Assistant Examiner*—Steven R. Garland

[57] ABSTRACT

A rotary head type digital signal reproducing apparatus controls tracking of rotary magnetic heads based on tracking reference signals obtained in an end portion of a first scan and in a beginning portion of a second scan immediately after the first scan, out of successive first through fourth scans made by the rotary magnetic heads with respect to two mutually adjacent tracks on the magnetic tape, when playing the magnetic tape which has been recorded in a half-speed mode. In the half-speed mode, a rotational speed of the rotary magnetic heads and a tape transport speed of the magnetic tape are set to speed which are one-half those in a standard mode. But when playing on the reproducing apparatus the magnetic tape which has been recorded in the half-speed mode, only the tape transport speed is set identical to that in the half-speed mode, and the rotational speed of the rotary magnetic heads is set identical to that in the standard mode.

4 Claims, 27 Drawing Sheets

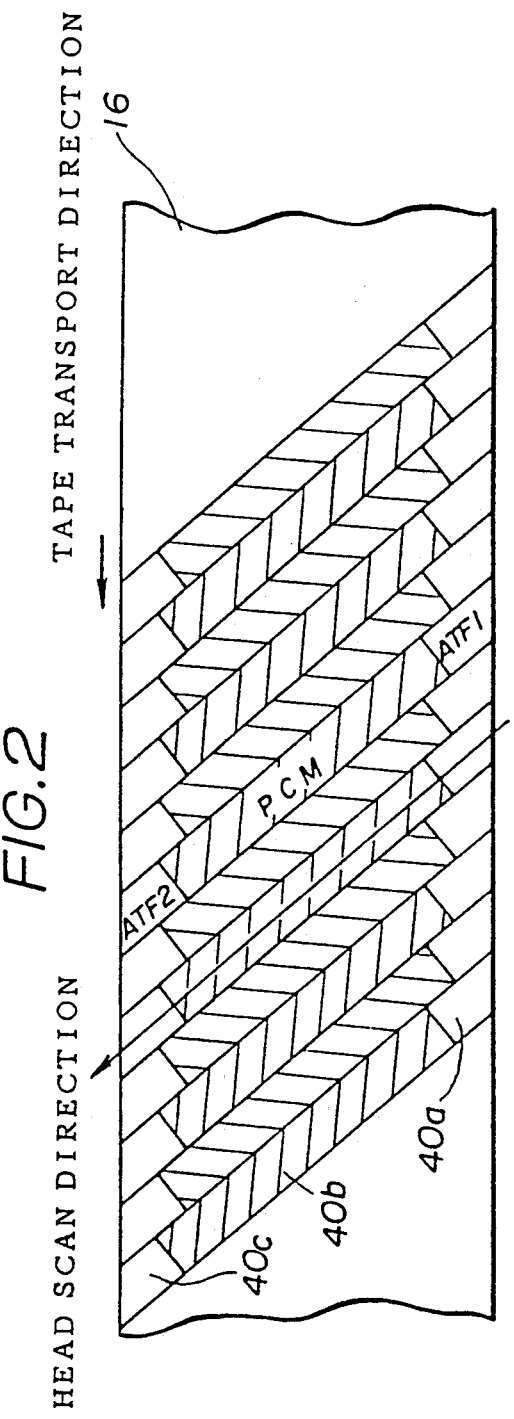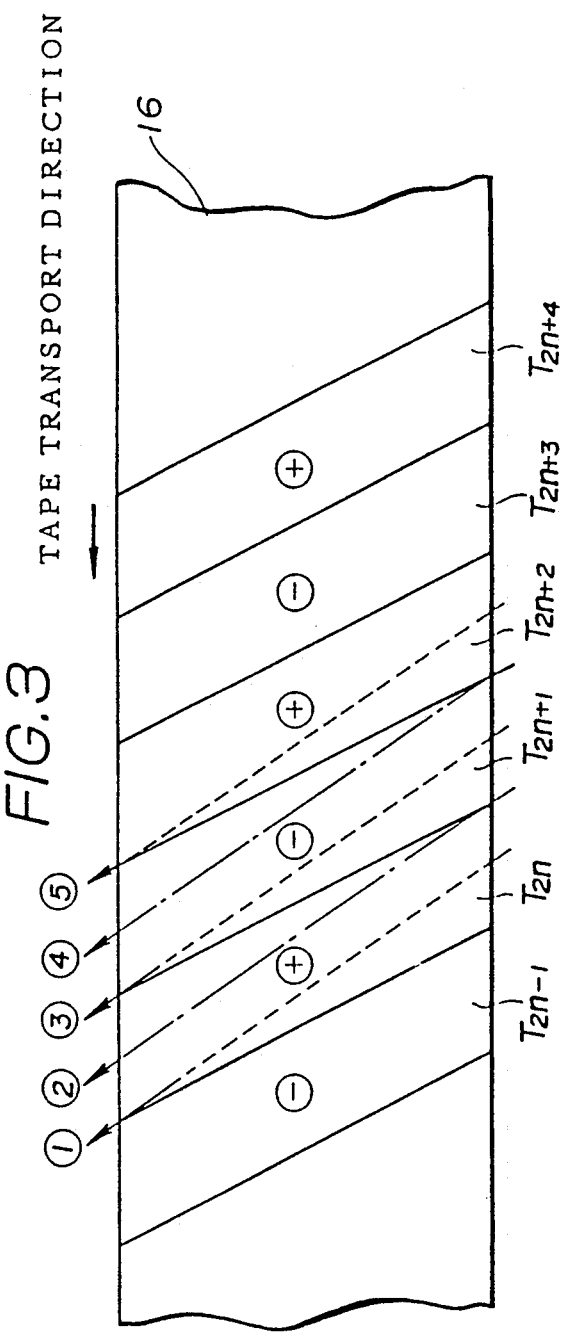

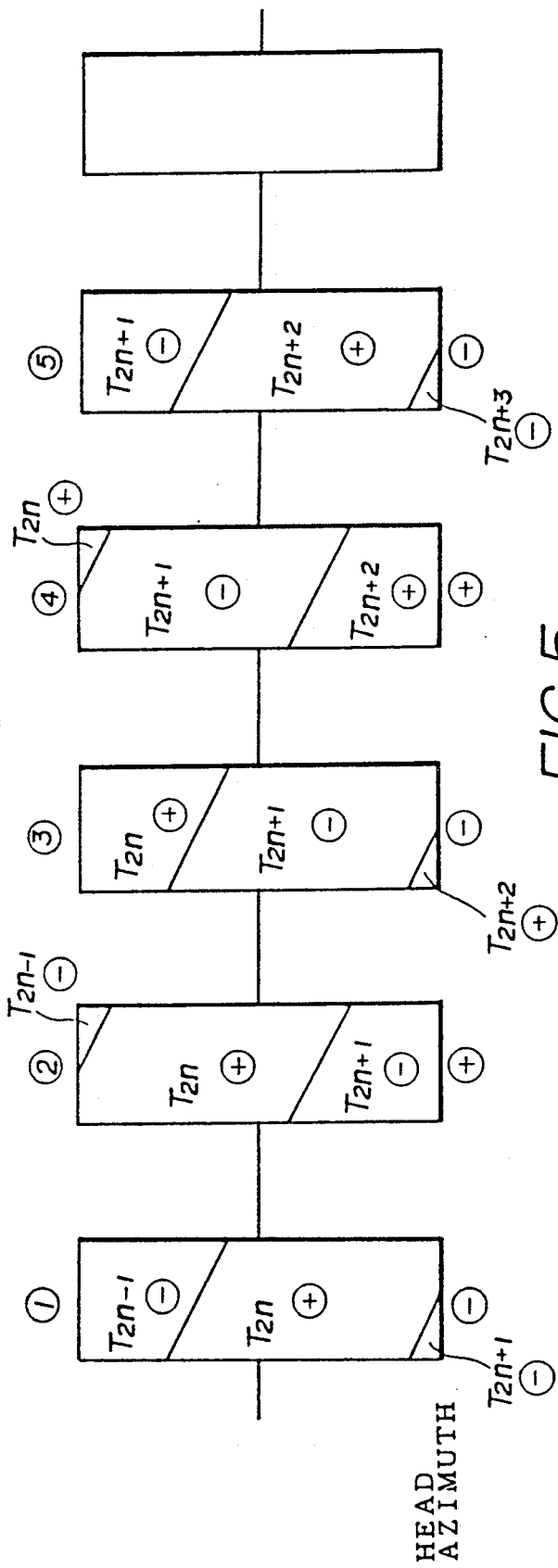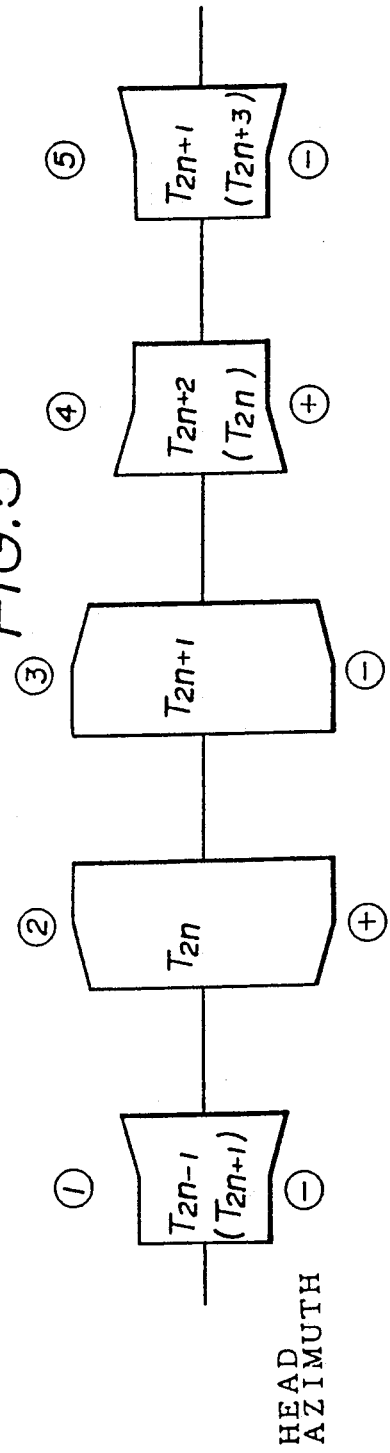

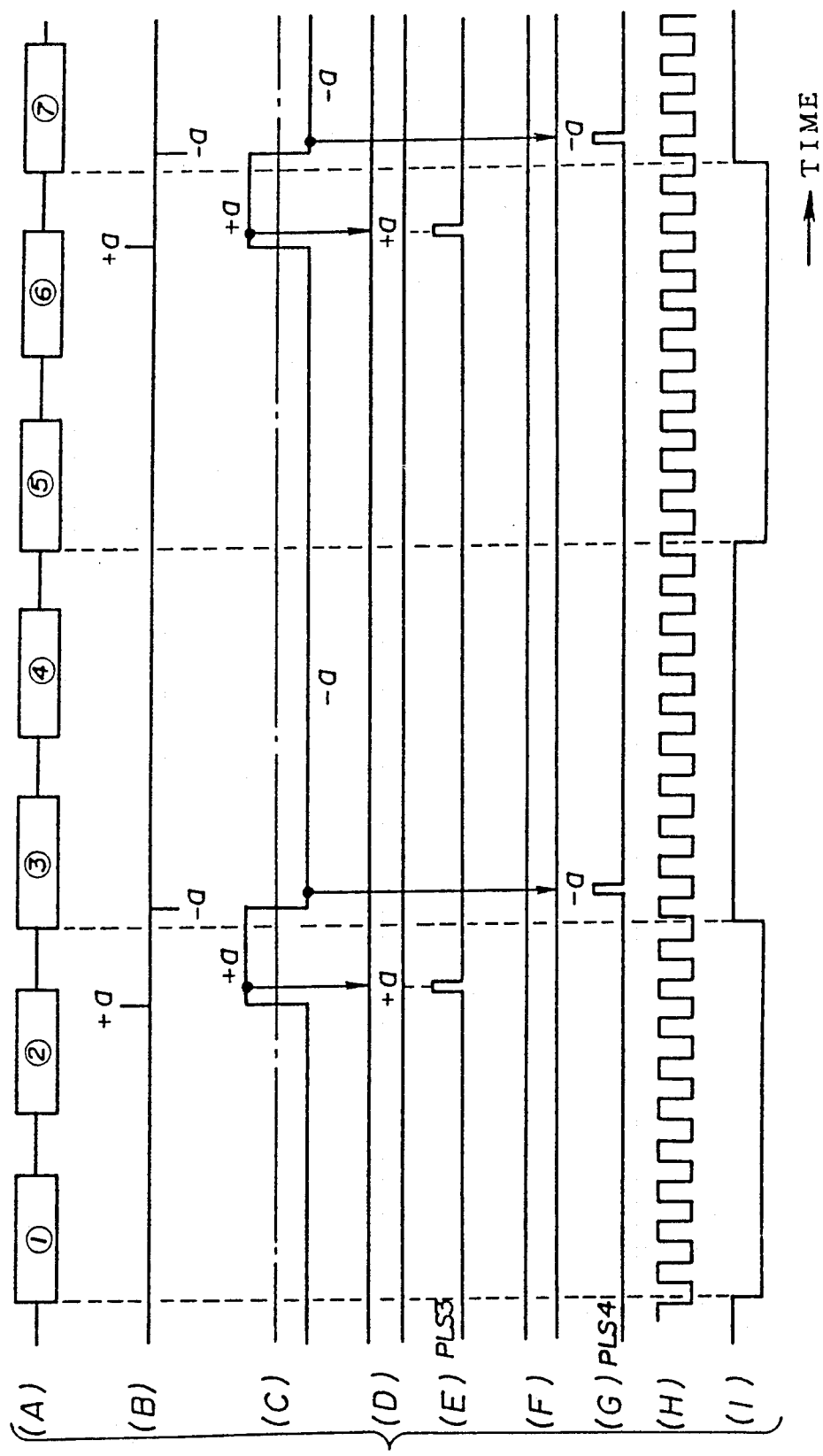

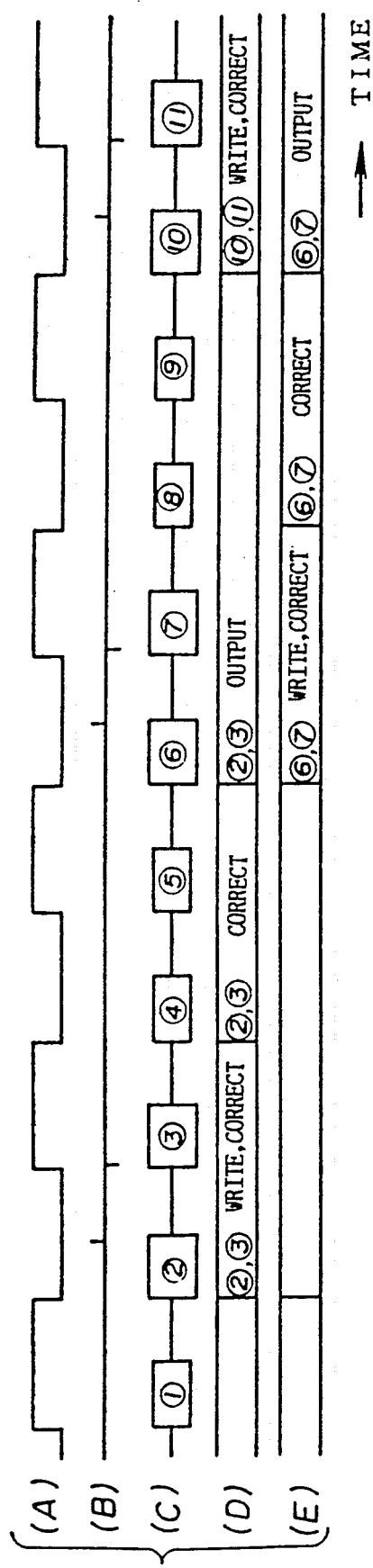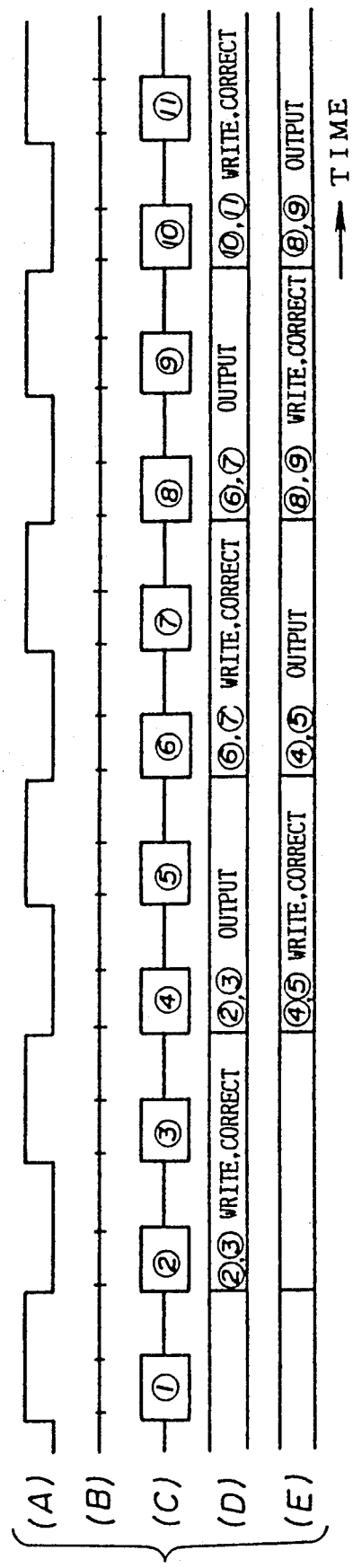

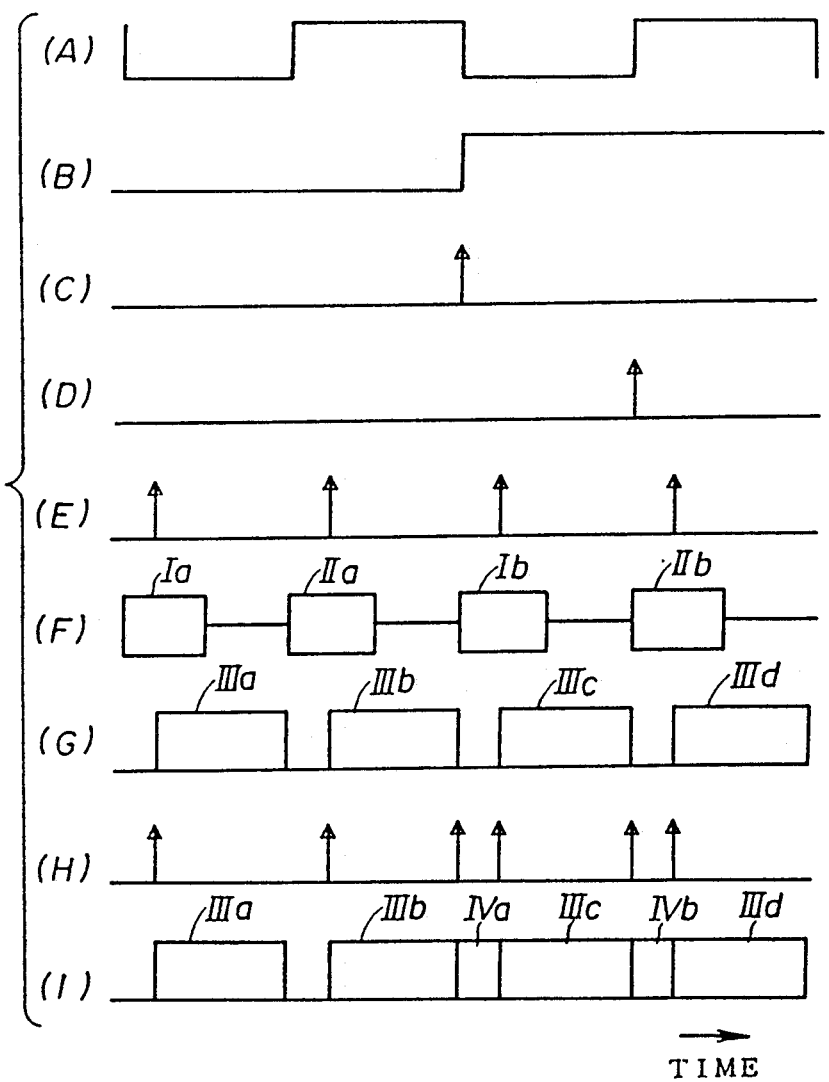

ROTARY HEAD TYPE DIGITAL SIGNAL REPRODUCING APPARATUS WITH SLOW TAPE SPEED MODE AND IMPROVED TRACKING CONTROL

BACKGROUND OF THE INVENTION

The present application is a Continuation-In-Part Application of U.S. Pat. Application Ser. No. 091,085 filed Aug. 31, 1987, now U.S. Pat. No. 4,839,755.

The present invention generally relates to rotary head type digital signal reproducing apparatuses, and more particularly to a rotary head type digital signal reproducing apparatus for playing a magnetic tape which is pre-recorded with a tracking reference signal in predetermined starting and ending portions of each track which is formed obliquely to the longitudinal direction of the magnetic tape and with a digital audio signal in an intermediate portion between the starting and ending portions of each track.

In a digital audio tape recorder, an analog audio signal is modulated into PCM audio data by a pulse code modulation (PCM), and the PCM audio data are recorded on and reproduced from a magnetic tape. In a rotary head type digital audio tape recorder which employs rotary magnetic heads, data are successively recorded on and reproduced from tracks formed obliquely to a longitudinal direction of the magnetic tape without a guard band between two mutually adjacent tracks, alternately by a pair of rotary heads having gaps of mutually different azimuth angles. A tracking reference signal is recorded on and reproduced from starting and ending portions of each track, while the PCM audio data are recorded and reproduced from an intermediate portion between the starting and ending portions of each track with a predetermined signal format.

The PCM audio data are recorded and reproduced with at least two kinds of modes. In a linear standard mode, the PCM audio data have a sampling frequency of 48 kHz, two channels and a quantization number of sixteen bits. On the other hand, in a non-linear long-time mode (hereinafter referred to as a half-speed mode), the PCM audio data have a sampling frequency of 32 kHz, two channels and a quantization number of twelve bits. Actually, there are other non-linear modes such as a mode in which the PCM audio data have a sampling frequency of 44.1 kHz, four channels and a quantization number of twelve bits, however, these other modes all have the same play time as the standard mode.

In the half-speed mode, the rotational speed of a rotary drum on which the rotary heads are mounted and the tape transport speed are respectively set to speeds which are one-half those in the standard mode. In addition, the frequencies of digital signals (more accurately, the frequencies of clock pulses for producing the PCM audio data and the tracking reference signal) are set to one-half those in the standard mode. In other words, the operation speed of the digital audio tape recorder as a whole in the half-speed mode is set to one-half that in the standard mode, except for a part of the digital audio tape recorder where a conversion is carried out between the analog audio signal and the digital signal.

The data rate in the standard mode is 48 (kHz)×2×16=1536 (kbits/sec), and the data rate in the half-speed mode is 32 (kHz)×2×12=768 (kbits/sec). Accordingly, the sound quality obtained in the half-speed mode is slightly deteriorated when compared to that obtained in the standard mode, but there is an advantage in that the play time in the half-speed mode is two times that in the standard mode for a given length of the magnetic tape because the operation speed of the digital audio tape recorder in the half-speed mode is set to one-half that in the standard mode.

It is desirable that the half-speed mode is added to the rotary head type digital audio tape recorder having the standard mode. However, due to the following problems, the realization of such a digital audio tape recorder is difficult costwise and technically, and would cause deterioration in the quality of the digital audio tape recorder.

Firstly, the tracking reference signal frequency and the carrier frequency of the PCM audio data in the half-speed mode become one-half those in the standard mode. For this reason, particularly in the reproducing mode, the operation frequencies of an analog filter circuit part and a phase locked loop (PLL) circuit part for reading data within a signal processing circuit for processing the tracking reference signal and the PCM audio data must be switched between the standard and half-speed modes. Alternatively, it is necessary to provide a circuit part exclusively for use in the standard mode and another circuit part exclusively for use in the half-speed mode.

Secondly, the coupling between the rotary heads mounted on the rotary drum and a recording amplifier and a reproducing amplifier is normally made through a rotary transformer. However, since the signal frequency in the half-speed mode becomes one-half that in the standard mode, the coupling in the low frequency range becomes deteriorated in the half-speed mode.

Thirdly, when the setting is made so that an optimum carrier-to-noise ratio is obtained in the standard mode, an output voltage of the reproducing rotary head in the half-speed mode becomes one-half that in the standard mode because the relative linear velocity between the magnetic tape and the rotary head in the half-speed mode is one-half that in the standard mode. As a result, according to this setting, the carrier-to-noise ratio becomes deteriorated in the half-speed mode.

Fourthly, a drum motor for rotating the rotary drum and a capstan motor for rotating a capstan which drives the magnetic tape must have predetermined performances in the two rotational speeds corresponding to the standard and half-speed modes, where the predetermined performances refer to the tolerable range of the jitter in the rotation of the rotary drum for maintaining phase synchronism between the rotation of the rotary drum and an electrical circuit, the tolerable range of instability of the rotation of the capstan motor and the like.

SUMMARY OF THE INVENTION

Accordingly, it is a general object of the present invention to provide a novel and useful rotary head type digital signal reproducing apparatus in which the problems described before are eliminated.

Another and more specific object of the present invention is to provide a rotary head type digital signal reproducing apparatus for playing a magnetic tape pre-recorded with a time division multiplexed signal in one of first and second modes, where the time division multiplexed signal comprises a PCM audio data which is obtained by subjecting an original audio signal to a pulse code modulation and a tracking reference signal. The tracking reference signal which amounts to a predetermined time period is time division multiplexed before and after the PCM audio data which amounts to a certain time period, and the time division multiplexed signal is recorded on successive tracks formed obliquely to a longitudinal direction of the magnetic tape by two rotary heads. In the second mode, a data quantity per unit time, a frequency of the tracking reference signal, a rotational speed of the rotary heads and a tape transport speed of the magnetic tape are one-half those in the first mode. The rotary head type digital signal reproducing apparatus comprises a reproducing circuit including two rotary heads for reproducing pre-recorded signals from the magnetic tape, a circuit for setting the tape transport speed to a speed identical to that in the second mode and for setting the rotational speed of the rotary heads to a speed identical to that in the first mode when playing the magnetic tape pre-recorded in the second mode, a tracking control circuit for controlling tracking of the rotary heads based on reproduced tracking reference signals reproduced by the reproducing circuit, where the reproduced tracking reference signals include out of reproduced signals obtained from the reproducing circuit during a total of four successive scans made by the rotary heads with respect to two mutually adjacent tracks on the magnetic tape at least a reproduced tracking reference signal obtained in an ending portion of a first scan and a reproduced tracking reference signal obtained in a beginning portion of a second scan immediately after the first scan, and the first and second scans are successive scans in which a large reproduced output is obtainable by the rotary heads from the two mutually adjacent tracks, and a decoding circuit for decoding the reproduced signals obtained from the reproducing circuit into the original audio signal based on a reproduced PCM audio data reproduced from one of the two mutually adjacent tracks during the first scan and a reproduced PCM audio data reproduced from the other of the two mutually adjacent tracks during the second scan.

According to the apparatus of the present invention, the frequencies of the tracking reference signal and the modulated PCM audio data when playing the magnetic tape pre-recorded in the second mode can be made substantially the same as those in the first mode, since the magnetic tape recorded in the second mode is played with the rotational speed of the rotary heads set to two times that at the time of the recording. For this reason, circuit parts of the apparatus can be used in common when playing the magnetic tape pre-recorded in the first mode and when playing the magnetic tape pre-recorded in the second mode.

Still another object of the present invention is to provide a rotary head type digital signal reproducing apparatus in which the decoding circuit comprises a memory for temporarily storing the reproduced PCM audio data including parity codes, and an error detecting and correcting circuit for detecting and correcting errors in the reproduced signals by carrying out an error detecting and correcting operation on the PCM audio data including parity codes stored in the memory. The error detecting and correcting operation is carried out at the same speed when playing the magnetic tape pre-recorded in the first mode and the magnetic tape pre-recorded in the second mode, and the error detecting and correcting operation is repeated two times when playing the magnetic tape pre-recorded in the second mode.

According to the apparatus of the present invention, the error detecting and correcting capability is improved compared to the conventional apparatus, and it is possible to obtain a reproduced audio signal of a high sound quality.

A further object of the present invention is to provide a rotary head type digital signal reproducing apparatus in which the error correcting operation is carried out within first correcting time periods during a first of two successive revolutions of the rotary heads and also within second correcting time periods during a latter of the two successive revolutions when playing the magnetic tape pre-recorded in the second mode. The first correcting time periods respectively start a predetermined time after a beginning of a scan to an end of the scan made by a corresponding one of the two rotary heads during the first revolution, and the second correcting time periods respectively start a predetermined time after a beginning of a scan to an end of the scan made by a corresponding one of the two rotary heads during the second revolution. The error correcting operation is carried out also within at least one of third correcting time periods. One of the third correcting time periods is defined by an end of one of the first correcting time periods corresponding to an end of the first revolution and a start of one of the second correcting time periods corresponding to the predetermined time after a beginning of the second revolution. The other of the third correcting time periods is defined by an end of the one of the second correcting time periods and a start of the other of the second correcting time periods.

According to the apparatus of the present invention, the error correcting capability is further improved because the third correcting time period is effectively utilized for the correction.

Another object of the present invention is to provide a rotary head type digital signal reproducing apparatus for playing a magnetic tape pre-recorded with a time division multiplexed signal in one of first and second modes, where the time division multiplexed signal comprises a pulse code modulated audio data which is obtained by subjecting an original audio signal to a pulse code modulation and a tracking reference signal, the tracking reference signal which amounts to a predetermined time period is time division multiplexed before and after the pulse code modulated audio data which amounts to a certain time period, the time division multiplexed signal is recorded on successive tracks formed obliquely to a longitudinal direction of the magnetic tape by two rotary magnetic heads, and during the recording in the second mode, a data quantity per unit time, a frequency of the tracking reference signal, a rotational speed of the rotary magnetic heads and a tape transport speed of the magnetic tape are one-half those in the first mode. The rotary head type digital signal reproducing apparatus comprises reproducing means including two rotary magnetic heads for reproducing pre-recorded signals from the magnetic tape, means for setting the tape transport speed to a speed identical to that in the second mode and for setting the rotational speed of the rotary magnetic heads to a speed identical to that in the first mode when playing the magnetic tape pre-recorded in the second mode, and tracking control means for controlling tracking of the rotary magnetic heads based on reproduced tracking reference signals reproduced by the reproducing means. The reproduced tracking reference signals include out of reproduced signals obtained from the reproducing means during successive first through fourth scans made by the rotary magnetic heads with respect to two mutually adjacent tracks on the magnetic tape a reproduced tracking reference signal obtained in an end portion of the first scan and a reproduced tracking reference signal obtained in a beginning portion of the second scan immediately after the first scan, where the first and second scans are successive scans in which a large reproduced output is obtainable by the rotary magnetic heads from the two mutually adjacent tracks compared to the third and fourth scans.

According to the reproducing apparatus of the present invention, it is possible to always carry out a stable tracking control operation even when a signal dropout occurs. Hence, it is possible to reproduce from the magnetic tape which has be recorded in the second mode (conventional half-speed mode) the PCM audio data of an extremely high quality in the half-speed mode of the present invention which provides the long play time compared to the standard mode.

Other objects and further features of the present invention will be apparent from the following detailed description when read in conjunction with the accompanying drawings.

BRIEF DESCRIPTION OF THE DRAWINGS

FIG. 2 shows a track pattern on a magnetic tape played on the apparatus shown in FIG. 1;

FIG. 3 is a diagram for explaining scanning loci of rotary heads of the apparatus shown in FIG. 1 in a half-speed mode;

FIG. 4 is a diagram for explaining contact areas of the rotary heads with respect to recorded tracks on the magnetic tape;

FIG. 5 is a diagram for explaining output signal levels of the rotary heads for the case shown in FIG. 4;

FIGS. 12(A) through 12(D) and FIGS. 13(A) through 13(I) show signal waveforms for explaining the operation of the block system shown in FIG. 11;

FIGS. 14(A) through 14(E) and FIGS. 15(A) through 15(E) are timing charts for explaining the operation of a memory and the like in the half-speed mode and the standard mode, respectively;

FIGS. 26() through 26(I) are timing charts for explaining the operation of the circuit system shown in FIG. 25;

DETAILED DESCRIPTION

Figure 1:
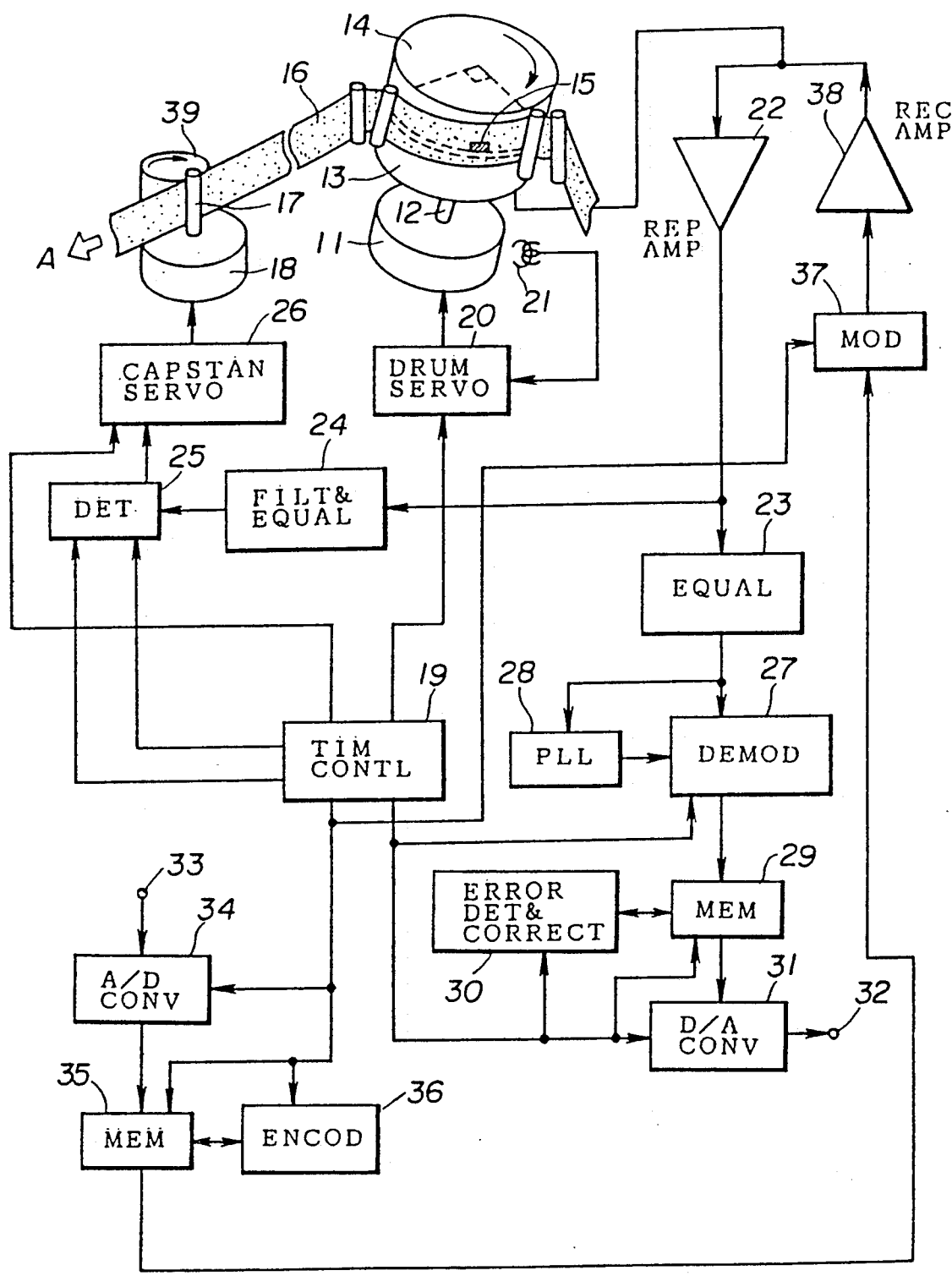
FIG. 1 is a system block diagram showing a first embodiment of the rotary head type digital signal reproducing apparatus according to the present invention.

FIG. 1 shows a first embodiment of the rotary head type digital signal reproducing apparatus according to the present invention. In order to facilitate the understanding of the present invention, FIG. 1 also shows an essential part of a recording system which is known, and in this respect, the apparatus shown in FIG. 1 is actually a recording and reproducing apparatus.

First, although not directly related to the subject matter of the present invention, a description will be given on the recording operation. An analog audio signal applied to an input terminal 33 is converted into PCM audio data in an analog-to-digital (A/D) converter 34, and the PCM audio data are thereafter written into a memory 35. The PCM audio data are added with a parity code generated in an encoder 36, and are supplied to a modulating circuit 37 after being interleaved and being subjected to a time base compression. The modulating circuit 37 produces a modulated digital signal by modulating the PCM audio data and the added parity code based on a known modulation system (for example, the 8-10 conversion).

On the other hand, a timing control circuit 19 generates a gate signal, and a tracking reference signal such as a synchronizing signal $f_S$ and a pilot signal $f_P$ during an interval corresponding to a tracking reference signal recording section of each track on a magnetic tape 16. The gate signal and the tracking reference signal are supplied to the modulating circuit 37, and the modulating circuit selectively outputs the modulated digital signal or the tracking reference signal responsive to the gate signal.

Accordingly, the modulating circuit 37 produces a time division multiplexed signal in which the modulated digital signal is transmitted in a certain interval and the tracking reference signal is transmitted in predetermined intervals before and after the certain interval. This time division multiplexed signal is passed through a recording amplifier 38 and a rotary transformer (not shown) and is supplied to two rotary magnetic heads mounted at diametrical positions on a rotary drum 14, and the time division multiplexed signal is alternately recorded on a magnetic tape 16 by the two rotary magnetic heads in either the standard more or the half-speed mode. As a result, a track pattern such as that shown in FIG. 2 is formed on the tape 16.

In FIG. 1, a rotary shaft 12 of a drum motor 11 penetrates a central portion of a stationary drum 13 and is fixed to a central portion of the rotary drum 14. A rotary head 15 and another rotary head (not shown) are mounted at the diametrical positions on a rotational plane of the rotary drum 14. The tape 16 is wrapped obliquely around a peripheral surface of the rotary drum 14 for an angular range of approximately 90°. The tape 16 is transported in a direction A in a state pinched between a capstan 17 and a pinch roller 39.

The rotary head 15 and the other rotary head have gaps of mutually different azimuth angles, and the two rotary heads have a track width greater than a track width of the recorded tracks on the tape 16. For example, the track width of the two rotary heads are 1.5 times the track width of the recorded tracks. The rotary shaft 12 rotates unitarily with the rotary drum 14. In the standard mode, the rotary heads rotate at a rotational speed of 2000 rpm, for example, and the rotary heads also rotate at this rotational speed of 2000 rpm in the half-speed mode of the present invention. In the half-speed mode of the present invention, the tape transport speed of the tape 16 which is driven by the capstan 17 is set to one-half the tape transport speed in the standard mode.

The tape 16 has the track pattern shown in FIG. 2. In each track shown in FIG. 2, the PCM audio data amounting to a predetermined time is recorded in a track portion 40b indicated by a hatching, and the tracking reference signal (ATF1) is recorded in a track portion 40a between the beginning of the track and the beginning of the track portion 40b and the tracking reference signal (ATF2) is also recorded in a track portion 40c between the end of the track portion 40b and the end of the track.

The tape 16 is pre-recorded in the conventional half-speed mode, and at the time of the recording in the half-speed mode, two rotary heads rotate at 1000 rpm. However, in the half-speed mode of the present invention, this tape 16 is played by rotating the two rotary heads at 2000 rpm which is two times the speed at the time of the recording. A drum servo circuit 20 controls the rotation of the drum motor 11 and the rotary drum 14, based on a drum servo signal supplied from a timing control circuit 19. As is well known, the drum servo signal is compared in the servo circuit 20 with a drum pulse signal which is obtained by detecting the rotation of the rotary drum 14 by a stationary detection head 21, and the rotational speed and phase of the rotary drum 14 are controlled by the drum servo circuit 20.

On the other hand, the tape transport speed in the half-speed mode of the present invention is identical to that at the time of the recording. As a result, the scanning loci of the two rotary heads which rotate at two times the rotational speed at the time of the recording do not coincide with the tracks on the tape 16. As shown in FIG. 3, center lines of the successive scans become as indicated by phantom lines ① through ④ with respect to two mutually adjacent tracks $T_{2n}$ and $T_{2n+1}$. In other words, four scans are made by the two rotary heads with respect to the two mutually adjacent tracks $T_{2n}$ and $T_{2n+1}$.

In FIG. 3, the tracks $T_{2n-1}$, $T_{2n+1}$, and $T_{2n+3}$ are tracks recorded by the rotary head having the gap of a negative azimuth angle, while the tracks $T_{2n}$, $T_{2n+2}$ and $T_{2n+4}$ are tracks recorded by the rotary head having the gap of a positive azimuth angle. No guard band is formed between two mutually adjacent tracks. The phantom lines ① and ③ indicate the center lines of the scans made by the rotary head (for example, the rotary head provided diametrically to the rotary head 15) having the gap of the negative azimuth angle, and the phantom lines ② and ④ indicate the center lines of the scans made by the rotary head (for example, the rotary head 15) having the gap of the positive azimuth angle.

FIG. 4 shows the contact areas of the two rotary heads with respect to the tracks during the successive scans the center lines of which are indicated by ① through ⑤. Out of the signals alternately reproduced by the two rotary heads, a reproduced signal having a frequency over a predetermined value is obtained from the rotary head only when the rotary head scans the track which has been recorded by the rotary head having the gap of the same azimuth angle, due to the well known azimuth loss effect. In addition, the level of the reproduced signal is approximately proportional to the contact area of the rotary head which scans the track. Accordingly, when the two rotary heads scan the tape 16 shown in FIG. 3, the relationship of the tracks from which the reproduced signals are obtained by the two rotary heads and the signal levels thereof becomes as shown in FIG. 5.

As may be seen from FIG. 5, out of the four scans ① through ④ made by the two rotary heads with respect to the two mutually adjacent tracks $T_{2n}$ and $T_{2n+1}$, the reproduced signal levels obtained from the tracks $T_{2n}$ and $T_{2n+1}$ during the second and third scans ② and ③ are large compared to the reproduced signals levels obtained from the tracks $T_{2n}$ and $T_{2n+1}$ during the first and fourth scans ① and ④. Accordingly, in the present embodiment, the demodulation is carried out on the modulated PCM audio data within the reproduced signals obtained from the two mutually adjacent tracks $T_{2n}$ and $T_{2n+1}$ during the second and third scans, so that a satisfactory signal-to-noise (S/N) ratio is obtainable.

Figure 6:
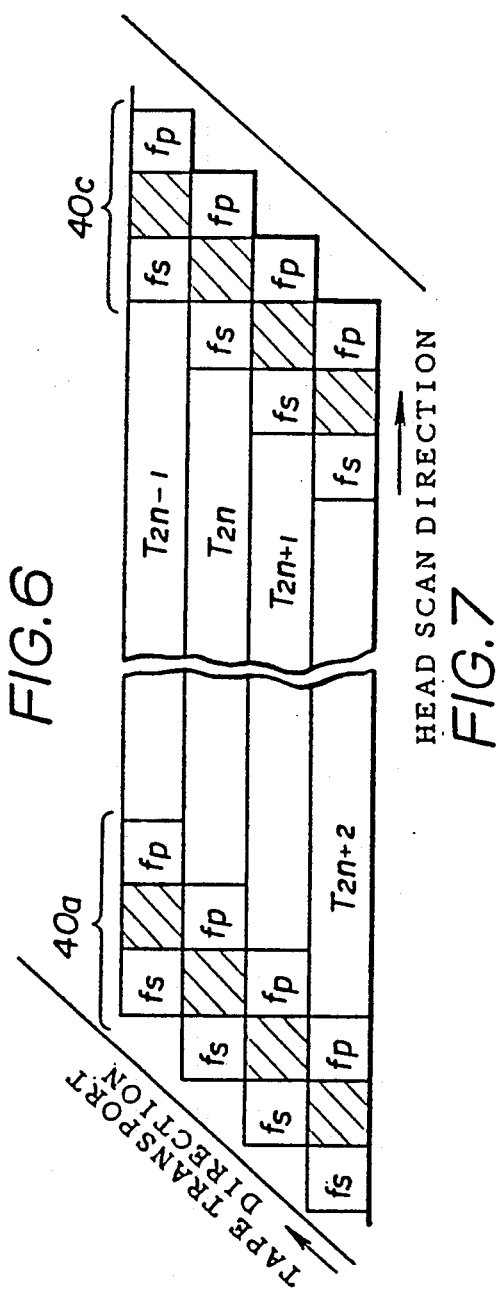
FIG. 6 shows a recording pattern of a tracking reference signal on the magnetic tape.

Next, a description will be given on the reproduction of the tracking reference signal. As described before, the tracking reference signal is recorded in the beginning portion and the ending portion of each track. The tracking reference signal is recorded with a signal pattern shown in FIG. 6. In FIG. 6, those parts which are the same as those corresponding parts in FIGS. 2 and 3 are designated by the same reference numerals. As shown in FIG. 6, the tracking reference signal comprises the synchronizing signal $f_S$ for controlling the sample and hold timing of the detected output of the tracking reference signal, and the pilot signal $f_P$. The frequency of the synchronizing signal $f_S$ is set to a relatively high frequency so that a sufficient azimuth loss effect would occur. For example, the synchronizing signal $f_S$ recorded on one of the two mutually adjacent tracks has a frequency of approximately 500 kHz while the synchronizing signal $f_S$ recorded on the other of the two mutually adjacent tracks has a frequency of approximately 780 kHz. On the other hand, the frequency of the pilot signal $f_P$ is set to a constant low frequency so that only a small azimuth loss effect would occur and the pilot signal $f_P$ would be reproduced as crosstalk from an adjacent track. For example, the pilot signal $f_P$ has a frequency of approximately 130 kHz.

As may be seen from FIG. 6, in each track portion where the tracking reference signal is recorded, the synchronizing signal $f_S$ is recorded in a synchronizing signal recording section, a signal recording section of approximately 1.56 MHz, for example, is provided after the synchronizing signal recording section for erasing the previous signal as indicated by a hatching, and the pilot signal $f_P$ is recorded in a pilot signal recording section. The signal recording sections are arranged so that the pilot signal recording section in one track is adjacent to the signal recording section indicated by the hatching in a track immediately preceding the one track, and the synchronizing signal recording section and the pilot signal recording section are not adjacent to each other between two mutually adjacent tracks. This signal pattern of the tracking reference signal is known.

Figure 7:
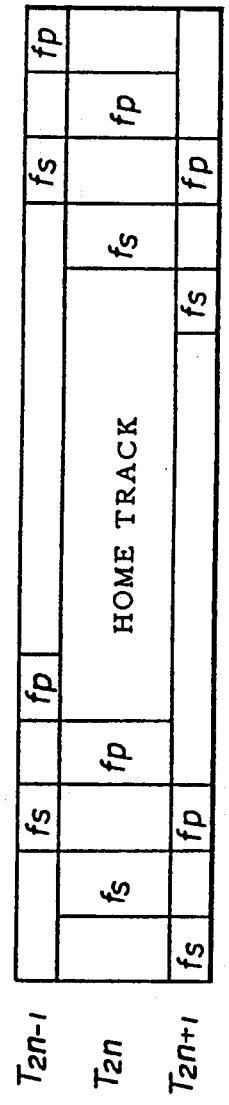
FIG. 7 shows scanning areas of the rotary heads with respect to a home track and tracks adjacent thereto.

When the track recorded with the tracking reference signal is scanned at the time of the reproduction in the same mode as that at the time of the recording by use of the rotary heads having the gaps of the same azimuth angles as those of the rotary heads which were used at the time of the recording, the rotary head which scans the track $T_{2n}$, for example, scans its home track $T_{2n}$ and portions of the adjacent tracks $T_{2n-1}$ and $T_{2n+1}$ on both sides of the home track $T_{2n}$ as shown in FIG. 7. (A "home track" of a reproducing rotary head means the track which was recorded by a head having the same azimuth angle as the reproducing head.) As described before, the synchronizing signal $f_S$ is only reproduced from the home track $T_{2n}$, while the pilot signal $f_P$ is not only reproduced from the home track $T_{2n}$ but is also reproduced as crosstalk from the adjacent tracks $T_{2n-1}$ and $T_{2n+1}$. As a result, the content of the reproduced signal obtained from the rotary head, the signal level and the reproduced track become as shown in FIG. 8.

Figure 8:
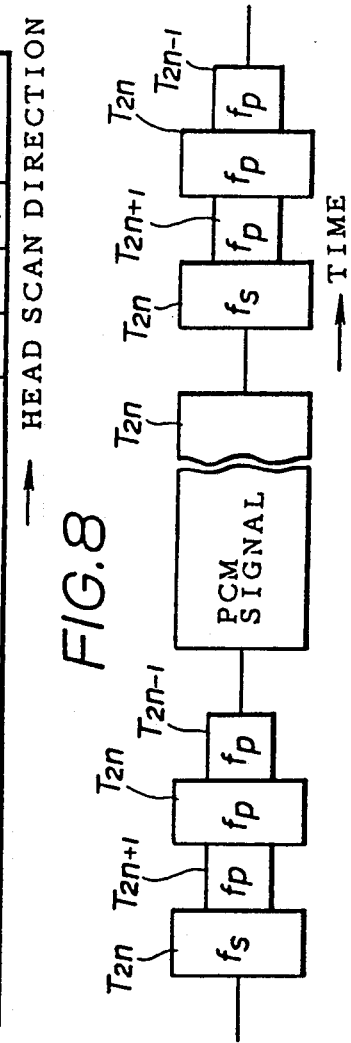
FIG. 8 schematically shows a reproduced signal comprising the tracking reference signal and a PCM audio signal.
Figure 9:
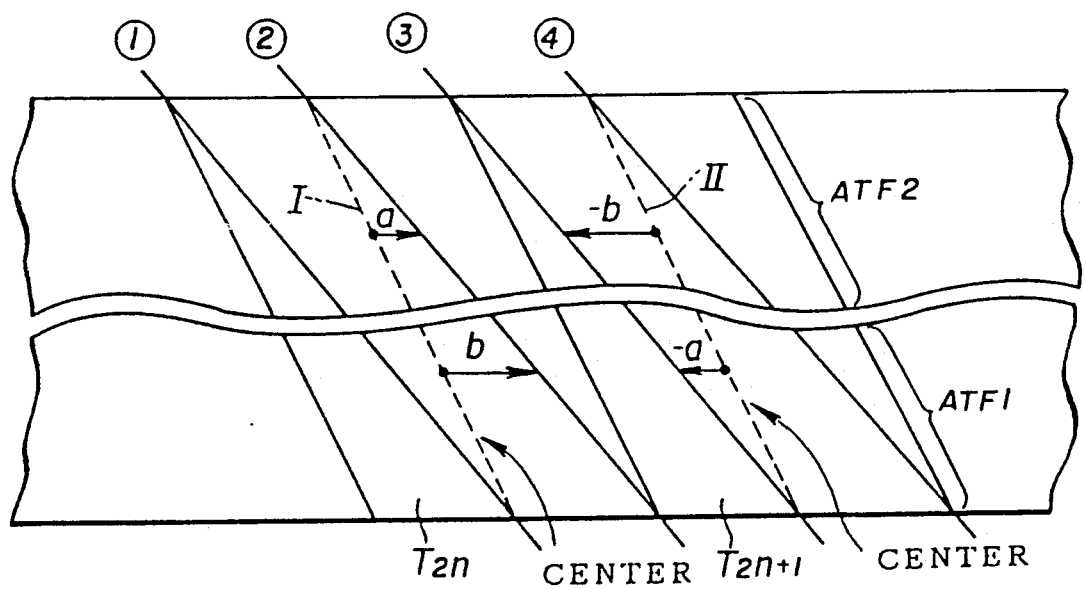
FIG. 9 is a diagram for explaining tracking offsets between tracking reference signal recording sections and the scanning loci of the rotary head.

However, FIG. 8 shows the case where the rotary head scans along a scanning locus identical to the track. When the rotary heads scan in the half-speed mode of the present invention the tracks which were recorded in the conventional half-speed mode, the rotary heads scan along scanning loci different from the recorded tracks as shown in FIG. 9. In FIG. 9, those parts which are the same as those corresponding parts in FIG. 3 are designated by the same reference numerals.

In FIG. 9, with respect to a center line I of the track $T_{2n}$, there is a tracking offset $+b$ (average value) in the tracking reference signal recording section at the beginning of the track $T_{2n}$ and a tracking offset $+a$ (average value) in the tracking reference signal recording section at the end of the track $T_{2n}$ during the second scan ②. In addition, with respect to a center line II of the next track $T_{2n+1}$, there is a tracking offset $-a$ (average value) in the tracking reference signal recording section at the beginning of the track $T_{2n}$ and a tracking offset $-b$ (average value) in the tracking reference signal recording section at the end of the track $T_{2n}$ during the third scan ③.

Figure 10:
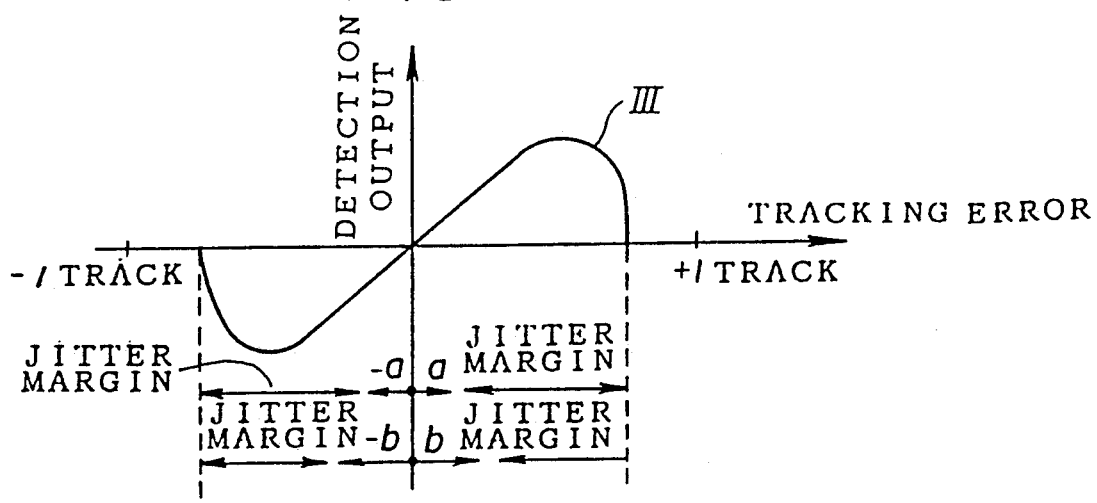
FIG. 10 shows a tracking reference signal detection output versus tracking error characteristic.

Accordingly, when the detected outputs of the two tracking reference signals including errors caused by the tracking offsets $+a$ and $-a$ are averaged, that is, when tracking error signals caused by the tracking offsets $+a$ and $-a$ are averaged, the effects of the tracking offsets become zero, and there is no need to carry out an additional process such as adding an offset voltage to the detected output of the tracking reference signal. Similarly, when the tracking error signals caused by the tracking offsets $+b$ and $-b$ are averaged, the effects of the tracking offsets also become zero. However, b is greater than a and it is desirable that the tracking error signal is small from the point of view of minimizing the jitter in the tracking reference signal. In addition, it may be seen from FIG. 10 which shows a tracking reference signal detection output versus tracking error characteristic III (S-curve) that the tolerable range of the jitter in the tracking reference signal, that is, the jitter margin, is larger for the case where the tracking error signals caused by the tracking offsets $+a$ and $-a$ are averaged.

Accordingly, in the present embodiment, the tracking control is carried out based on the two tracking reference signals respectively reproduced from the tracking reference signal recording section (track portion 40c) at the end portion of the track scanned during the second scan ② and from the tracking reference signal recording section (track portion 40a) at the beginning portion of the track scanned during the third scan ③.

It is of course possible to carry out the tracking control based on the tracking reference signals reproduced from all of the four tracking reference signal recording sections at the beginning and end portions of the two tracks scanned during the second and third scans ② and ③. Furthermore, it is possible to carry out the tracking control based on arbitrarily selected ones of the tracking reference signals reproduced from the four tracking reference signal recording sections of the two tracks scanned during the second and third scans ② and ③, and subtract an appropriate offset voltage when the averaged tracking offset does not become zero.

Returning now to the description of FIG. 1, the signals alternately reproduced from the tape 16 by the two rotary heads are passed through a rotary transformer (not shown) and a reproducing amplifier 22, and are supplied to a wave equalizing circuit 23 and a filtering and wave equalizing circuit 24. The synchronizing signal $f_S$ and the pilot signal $f_P$ are filtered and then subjected to a wave equalization in the filtering and wave equalizing circuit 24, and are supplied to a tracking reference signal detecting circuit 25.

As described before, the tracking reference signal is recorded in the conventional half-speed mode with a frequency which is one-half that in the standard mode. However, during the reproducing in the half-speed mode of the present invention, the rotary drum 14 rotates at the rotational speed which is two times that at the time of the recording which is carried out in the conventional half-speed mode, while the tape transport speed is set identical to that at the time of the recording. As a result, the tape transport speed is considerably small compared to the rotational speed of the rotary drum 14, and the tracking reference signal is reproduced with a frequency which is substantially the same as that in the standard mode. Hence, the filtering and wave equalizing circuit 24 can be used in common for the standard and half-speed modes.

Similarly, in the half-speed mode of the present invention, the carrier frequency of the PCM audio data becomes substantially the same as that in the standard mode. For this reason, the wave equalizing circuit 23, a phase locked loop (PLL) circuit 28 and the like can be used in common for the standard and half-speed modes.

Figure 11:
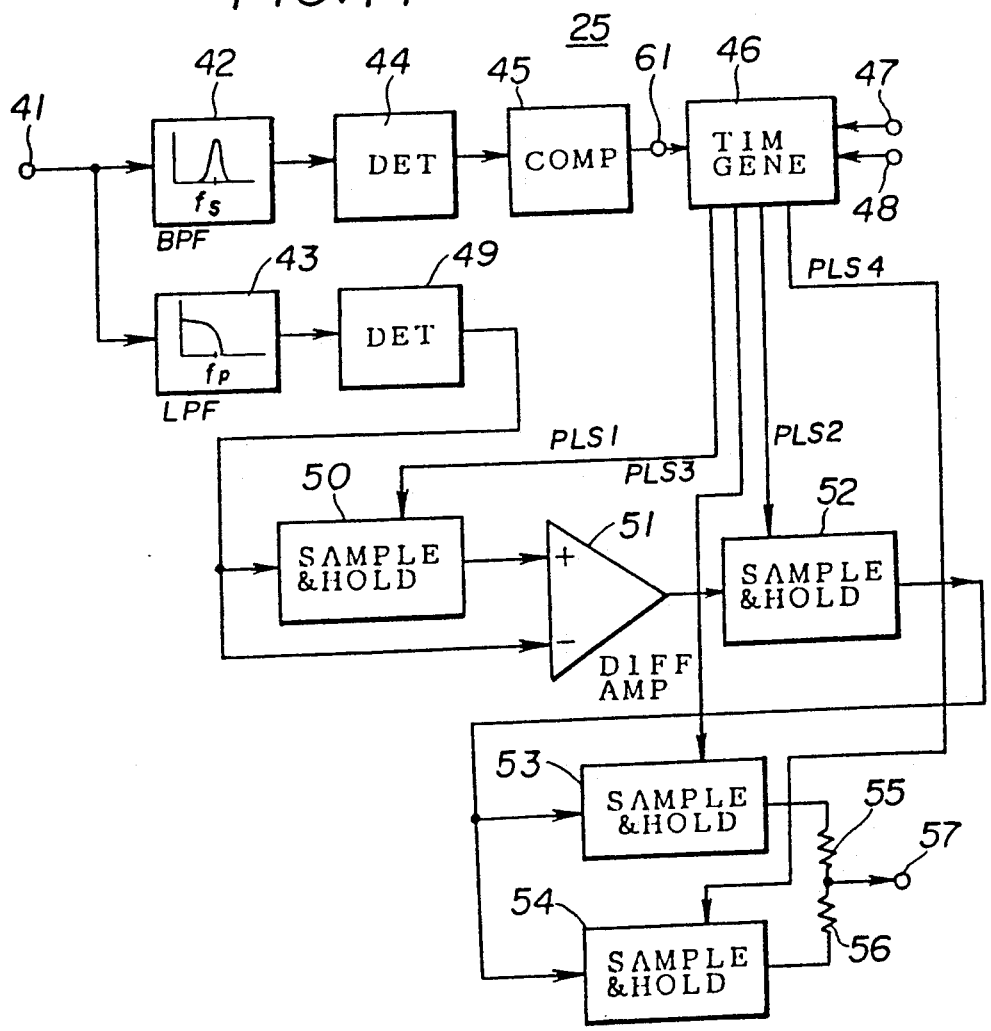
FIG. 11 is a system block diagram showing an embodiment of a tracking reference signal detecting circuit in the block system shown in FIG. 1.

FIG. 11 shows an embodiment of the tracking reference signal detecting circuit 25. In FIG. 11, the reproduced tracking reference signal is applied to an input terminal 41 and is supplied to a bandpass filter 42 and a lowpass filter 43. The bandpass filter 42 separates the reproduced synchronizing signal $f_S$ shown in FIG. 12(A) and FIG. 19(A) which will be described later, and supplies the reproduced synchronizing signal $f_S$ to a detecting circuit 44. The detecting circuit 44 detects the envelope of the reproduced synchronizing signal $f_S$ and supplies an output detection signal to a timing generating circuit 46 through a comparator 45. On the other hand, the lowpass filter 43 separates the reproduced pilot signal $f_P$ shown in FIG. 12(B) and FIG. 19(B) which will be described later.

Figure 20:
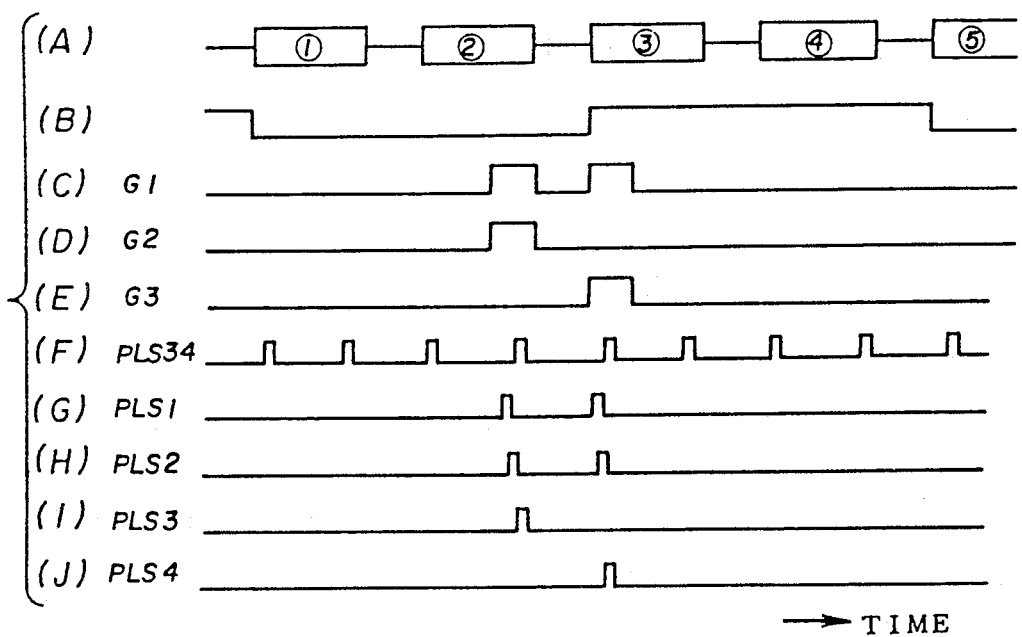

First and second timing signals respectively shown in FIGS. 13(H) and 13(I) are generated from the timing control circuit 19 shown in FIG. 1 and are supplied to the timing generating circuit 46 through input terminals 47 and 48. As shown in FIGS. 13(I) and 20(B), the second timing signal is a square wave having a polarity which is inverted for every two track scans in synchronism with the scanning of the tracks by the rotary heads shown schematically in FIGS. 14(A) and 20(A). On the other hand, as shown in FIG. 13(H), the first timing signal is a square wave having a constant repetition frequency in the order of ten odd times that of the second timing signal, for example. In FIGS. 13 and 20, the reference numerals ① through ④ correspond to the first through fourth scans ① through ④ of the rotary heads shown in FIGS. 2 and 9.

Figure 12:
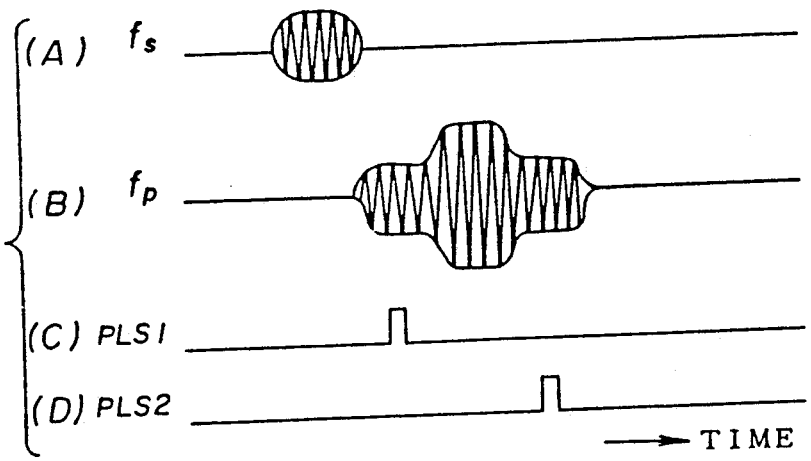

Based on the incoming signals, the timing generating circuit 46 generates a first sampling pulse signal PLS1 shown in FIG. 12(C), a second sampling pulse signal PLS2 shown in FIG. 12(D), a third sampling pulse signal PLS3 shown in FIG. 13(E), and a fourth sampling pulse signal PLS4 shown in FIG. 13(G).

Figure 18:
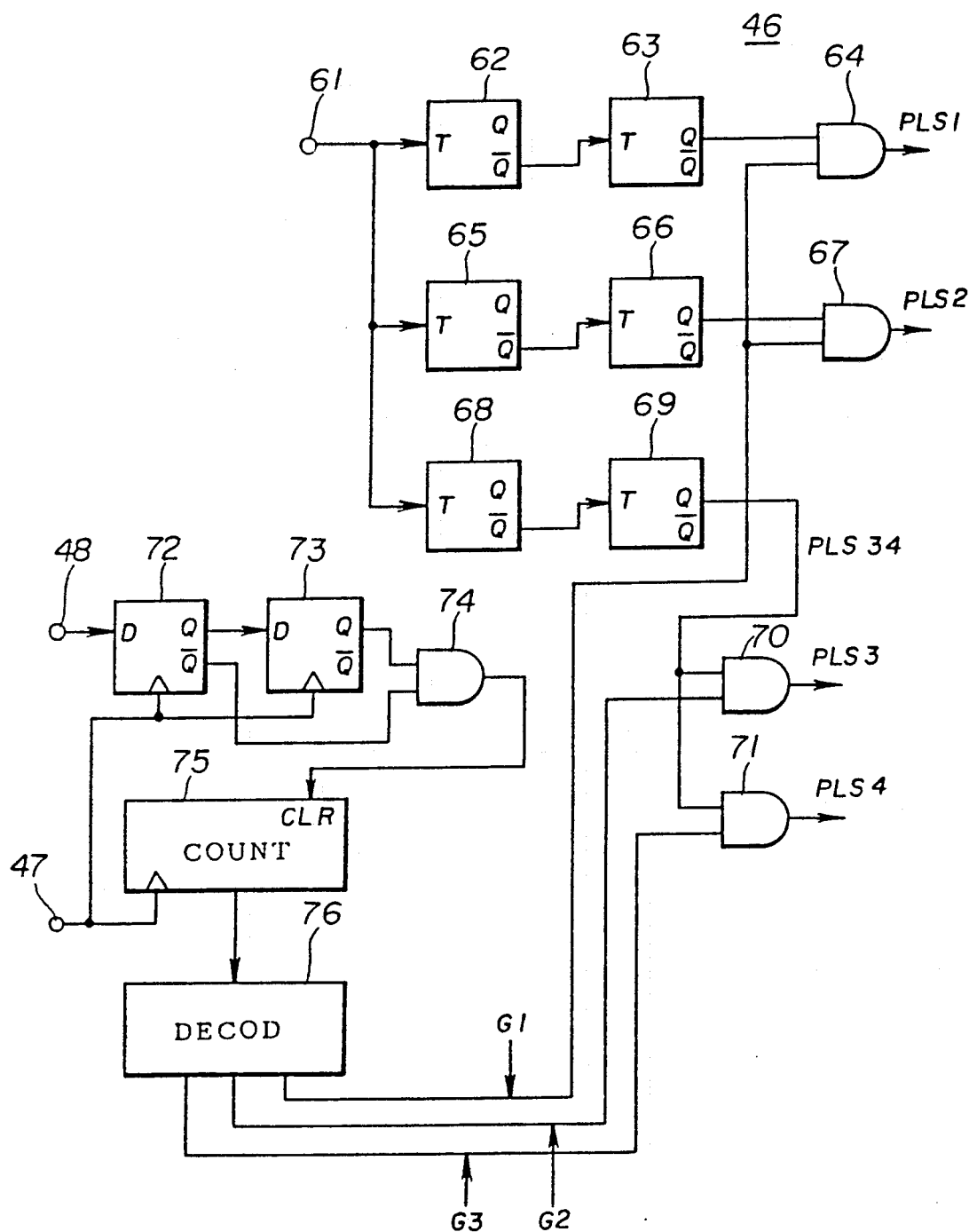
FIG. 18 is a system block diagram showing an embodiment of a timing generating circuit in the block system shown in FIG. 11.
Figure 19:
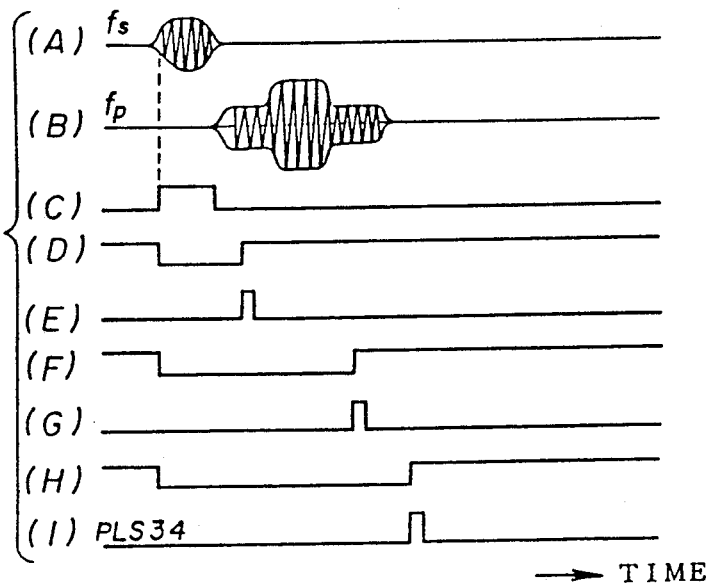
FIGS. 19(A) through 19(I) and FIGS. 20(A) through 20(J) show signal waveforms for explaining the operation of the block system shown in FIG. 18.

FIG. 18 shows an embodiment of the timing generating circuit 46. In FIG. 18, those parts which are the same as those corresponding parts in FIG. 11 are designated by the same reference numerals. In FIG. 18, the output signal of the comparator 45 shown in FIG. 19(C) is applied to a terminal 61 and is successively passed through monostable multivibrators 62 and 63, and an output signal of the monostable multivibrator 63 is supplied to one input terminal of a 2-input AND circuit 64. FIG. 19(D) shows a $\overline{Q}$-output signal of the monostable multivibrator 62, and FIG. 19(E) shows a Q-output signal of the monostable multivibrator 63.

The output signal of the comparator 45 is also successively passed through monostable multivibrators 65 and 66, and an output signal of the monostable multivibrator 66 is supplied to one input terminal of a 2-input AND circuit 67. Furthermore, the output signal of the comparator 45 is successively passed through monostable multivibrators 68 and 69, and an output signal of the monostable multivibrator 69 is supplied to one input terminal of a 2-input AND circuit 70 and to one input terminal of a 2-input AND circuit 71. FIGS. 19(F) and 19(G) respectively show a $\overline{Q}$-output signal of the monostable multivibrator 65 and a Q-output signal of the monostable multivibrator 66. FIG. 19(H) shows a $\overline{Q}$-output signal of the monostable multivibrator 68, and FIG. 19(I) and FIG. 20(F) which will be described later show a Q-output signal PLS34 of the monostable multivibrator 69.

On the other hand, the first timing signal shown in FIG. 13(H) and applied to the input terminal 47 shown in FIG. 18 is applied as a clock pulse signal to clock terminals of delay (D-type) flip-flops 72 and 73 and a counter 75. At the same time, the second timing signal shown in FIGS. 13(I) and 20(B) and applied to the input terminal 48 is applied to a data input terminal D of the flip-flop 72.

An AND circuit 74 is supplied with a $\overline{Q}$-output signal of the flip-flop 72 and a Q-output signal of the flip-flop 73 and obtains a logical product of the two signals. An output signal of the AND circuit 74 is applied to a clear terminal CLR of the counter 75. A counted output signal of the counter 75 is supplied to a decoder 76. The decoder 76 generates three kinds of gate signals G1, G2 and G3 respectively shown in FIGS. 20(C), 20(D) and 20(E) every time the counted value in the counter 75 reaches predetermined values. The gate signal G1 is supplied to the other input terminals of the AND circuits 64 and 67. The gate signal G2 is supplied to the other input terminal of the AND circuit 70, and the gate signal G3 is supplied to the other input terminal of the AND circuit 71. Accordingly, the sampling pulse signal PLS1 shown in FIGS. 12(C) and 20(G) is obtained from the AND circuit 64, and the sampling pulse signal PLS2 shown in FIGS. 12(D) and 20(H) is obtained from the AND circuit 67. In addition, the sampling pulse signal PLS3 shown in FIGS. 13(E) and 20(I) is obtained from the AND circuit 70, and the sampling pulse signal PLS4 shown in FIGS. 13(G) and 20(J) is obtained from the AND circuit 71.

Returning now to the description of FIG. 11, the reproduced pilot signal $f_P$ shown in FIGS. 12(B) and 19(B) from the lowpass filter 43 is supplied to a detecting circuit 49 wherein the envelope of the reproduced pilot signal $f_P$ il is detected. An output detection signal of the detecting circuit 49 is supplied to a sample and hold circuit 50 and a differential amplifer 51. The sample and hold circuit 50 samples and holds the signal reproduced from one of the adjacent tracks on both sides of the home track based on the sampling pulse PLS1, and supplies a sampled and held voltage to the differential amplifier 51.

An output signal of the differential amplifier 51 shown in FIG. 13(B) is supplied to a sample and hold circuit 52 and is sampled and held based on the sampling pulse signal PLS2 shown in FIG. 12(D) which is generated during a time when the pilot signal $f_P$ is reproduced from the other of the two adjacent tracks on both sides of the home track. As a result, a sampled and held voltage shown in FIG. 13(C) is obtained from the sample and hold circuit 52. As may be seen from FIG. 13(C), the sampled and held voltage obtained from the sample and hold circuit 52 is a detection voltage of the tracking reference signal comprising the held voltage of the envelope detection level of the pilot signal $f_P$ reproduced from the tracking reference signal recording section at the end portion of the track during the second scan ② and the held voltage of the envelope detection level of the pilot signal $f_P$ reproduced from the tracking reference signal recording section at the beginning portion of the track during the third scan ③.

The detection voltage of the tracking reference signal is supplied to sample and hold circuits 53 and 54 shown in FIG. 11 wherein the detection voltage is again sampled and held based on the respective sampling pulse signals PLS3 and PLS4 shown in FIGS. 13(E) and 13(G). Thus, sampled voltages shown in FIGS. 13(D) and 13(F) are respectively obtained from the sample and hold circuits 53 and 54, and are passed through respective mixing resistors 55 and 56 to be averaged. As a result, an averaged signal is obtained from a node between the resistors 55 and 56 and is outputted through an output terminal 57 as the tracking error signal.

The detection voltage of the tracking reference signal shown in FIG. 13(C) is sampled again in the sample and hold circuits 53 and 54 based on the sampling pulse signals PLS3 and PLS4 for the following reasons. That is, as may be seen from FIG. 13(C), the hold time of $+a$ and the hold time of $-a$ greatly differ. Since the tracking control is carried out based on the sampled and held voltages and the hold times, the resamplings in the sample and hold circuits 53 and 54 are carried out for the purpose of preventing undesirable effects caused by the different hold times.

At the time of the reproduction in the standard mode, the sampling pulse signal PLS3 is generated for every time period in which the tracking reference signal is reproduced from the tracking reference signal recording section at the end portion of each track. On the other hand, the sampling pulse signal PLS4 is generated for every time period in which the tracking reference signal is reproduced from the tracking reference signal recording section at the beginning portion of each track. In this case, it is possible to use the detection voltage from the sample and hold circuit 52 as the tracking error signal.

Returning now again to the description of FIG. 1, the tracking error signal from the tracking reference signal detecting circuit 25 is supplied to a capstan servo circuit 26 together with a timing signal from the timing generating circuit 19. Based on these signals, the capstan servo circuit 26 controls a capstan motor 18. Accordingly, the tape transport speed is controlled and the tracking control is carried out so that the rotary heads scan predetermined tracks.

The reproduced modulated PCM audio data (including parity code) obtained from the wave equalizing circuit 23 is supplied to the PLL circuit 28 and a demodulating circuit 27. A reproduced clock pulse signal obtained from the PLL circuit 28 is supplied to the demodulating circuit 27 and is used to demodulate the modulated PCM audio data. Responsive to a timing signal from the timing control circuit 19, the demodulating circuit 27 selectively supplies to a memory 29 only the PCM audio data (demodulated data) reproduced during the second and third scans ② and ③ of the rotary heads.

The memory 29 comprises first and second memory circuits (not shown), write/read control circuit (not shown) for the first and second memory circuits and the like. The operation of the memory 29 is shown schematically in FIGS. 14(D) and 14(E). FIG. 14(D) shows the operation of the first memory circuit and an error detecting and correcting circuit 30, and FIG. 14(E) shows the operation of the second memory circuit and the error detecting and correcting circuit 30. FIG. 14(C) schematically show the reproduced signal from the rotary heads, and ① through ④ respectively correspond to the reproduced signals obtained during the first through fourth scans ① through ④ shown in FIGS. 3 and 9. When two mutually adjacent tracks are scanned four times by the two rotary heads, the reproduced signals obtained during the second scan are denoted by ②, ⑥, ⑩, ... which are signals obtained during the (4m-2)th scans, where m is a positive integer. On the other hand, the reproduced signals obtained during the third scan are denoted by ③, ⑦, ⑪, ... which are signals obtained during the (4m-1)th scans. FIG. 14(A) shows the drum servo signal for controlling the drum motor 11, and FIG. 14(B) shows the output signal of the differential amplifier 51 within the tracking reference signal detecting circuit 25.

Figure 16:
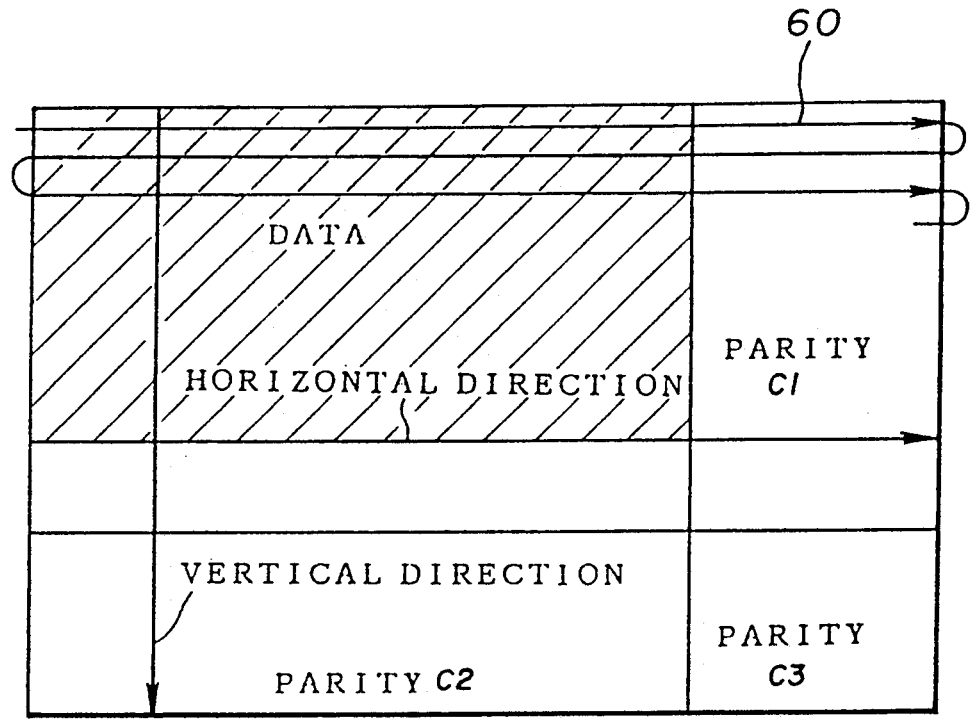
FIG. 16 shows a memory map of the memory shown in FIG. 1.

The memory 29 and the error detecting and correcting circuit 30 carry out operations with reference to various timing signals from the timing control circuit 19. FIG. 16 shows a memory map of the first and second memory circuits of the memory 29, wherein a data region is indicated by a hatching and a signal reproducing sequence is denoted by a line 60. The parity codes within the demodulated data are stored in a part other than the part indicated by the hatching. A first parity code C1 is generated from the data along the horizontal direction and a second parity code C2 is generated from the data along the vertical direction, respectively by using a generating polynomial. A third parity code C3 is generated from the second parity code C2 along the horizontal direction or from the first parity code C1 along the vertical direction, respectively by using the generating polynomial. According to such a doubly encoded coding, the error correcting capability is improved by repeatedly carrying out the error detecting and correcting operation.

FIG. 15(C) schematically shows the reproduced signals obtained at the time of the reproduction in the standard mode when the tape being played has been recorded in the standard mode. FIG. 15(A) shows the drum servo signal, and FIG. 15(B) shows the output signal of the differential amplifier 51 within the tracking reference signal detecting circuit 25 for this case. In this case, the first and second memory circuits of the memory 29 together with the error detecting and correcting circuit 30 respectively carry out the operations shown schematically in FIGS. 15(D) and 15(E).

As may be easily understood by comparing the operation of the memory 29 and the error detecting and correcting circuit 30 shown in FIGS. 15(D) and 15(E) during the reproduction in the standard mode and the operation of the memory 29 and the error detecting and correcting circuit 30 shown in FIGS. 14(D) and 14(E) during the reproduction in the half-speed mode of the present invention, in the half-speed mode of the present invention, the error detecting and correcting operation is carried out in the error detecting and correcting circuit 30 after the reproduced demodulated data is once stored in the memory 29 at the same speed as that during the error detecting and correcting operation in the standard mode.

Accordingly, during the half-speed mode of the present invention in which the data quantity per unit time is one-half that in the standard mode, it is possible to repeatedly carry out the error detecting and correcting operation two times. Therefore, the error correcting capability is improved.

Figure 17:
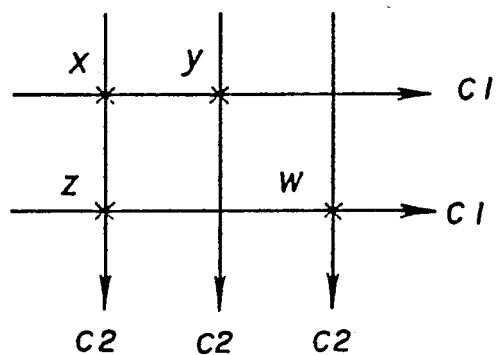
FIG. 17 is a diagram for explaining an error correcting operation.

For example, in the case where both the first and second parity codes C1 and C2 are single error correction codes and errors x, y, z and w exist as sown in FIG. 17, the error detecting and correcting operation using the first parity code C1 once and the second parity code C2 once in sequence can only correct the errors y and w and the errors x and z cannot be corrected. However, when the error detecting and correcting operation is carried out two times, the errors y and w can be corrected by the first correcting operation using the second parity code C2, and the errors x and z can be corrected by the second correcting operation using the first parity code C1 because the errors y and w are already corrected by the first correcting operation.

The demodulated data once read out from the memory 29 is subjected to the error detecting and correcting operation in the error detecting and correcting circuit 30, and is again written into the memory 29. However, when the error correction cannot be carried out, an error flag is set in a parity region of the memory 29.

It is possible to consider setting the error flag in the parity region of the memory 29 after carrying out the two error detecting and correcting operations each using the first and second parity codes C1 and C2 once. However, since the first and second parity codes C1 and C2 are respectively used two times in the present embodiment, the part where the error flag is set becomes an error when the second correcting operation or the correction of the parity code itself is carried out if the error flag were set in the parity region of the memory 29 after the first error detecting and correcting operation is carried out. For this reason, it is necessary to set the error flag in the parity region of the memory 29 only after the second error detecting and correcting operation is carried out.

The demodulated data is read out from the memory 29 after being subjected to a time base expansion, de-interleaving, jitter compensation and the like in the memory circuit 29. This demodulated data is supplied to a digital-to-analog (D/A) converter 31 shown in FIG. 1 and is converted into an original analog audio signal based on the timing signals from the timing control circuit 19. When supplying the demodulated data to the D/A converter 31, the error flag is read out beforehand so as to discriminate whether the data is valid or invalid. When an error exists and the data is invalid, the data is replaced by a data which is obtained by carrying out an interpolation on the sampled data before and after the data containing the error. The original analog audio signal from the D/A converter 31 is outputted through an output terminal 32.

Figure 21:
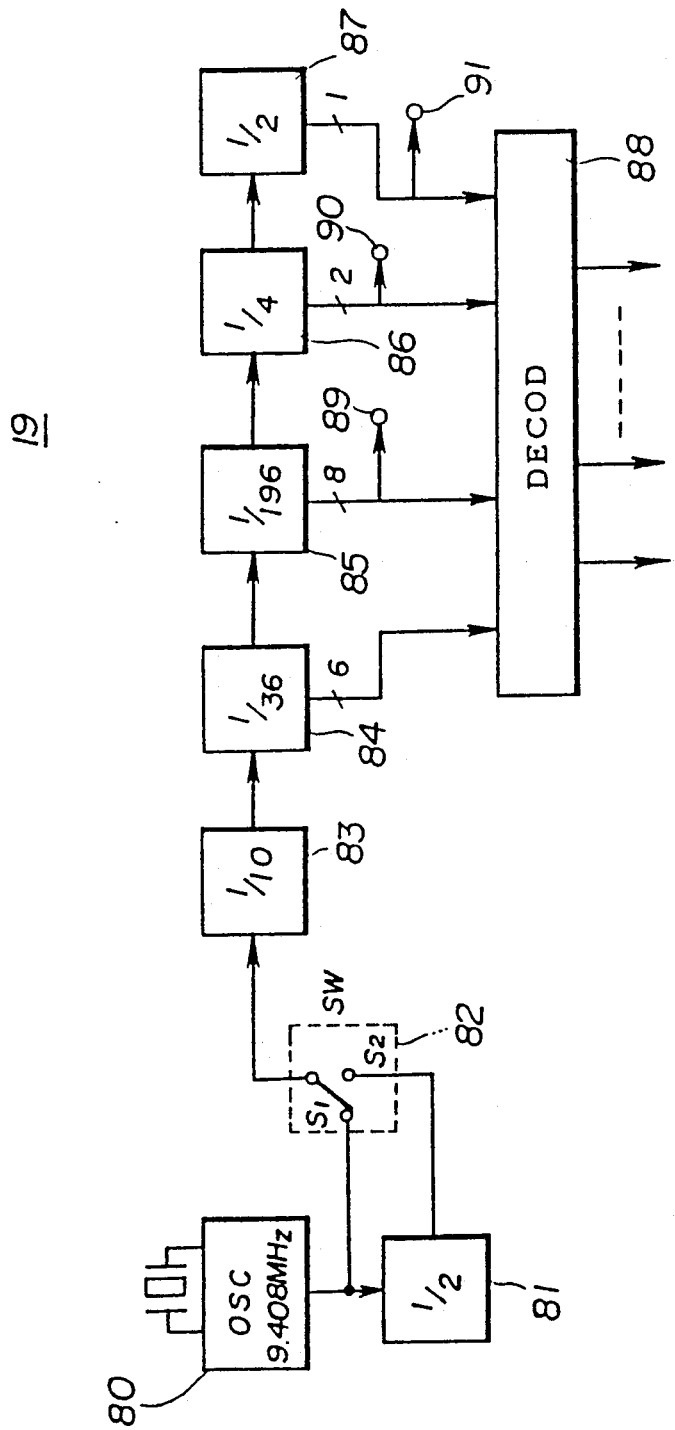
FIG. 21 is a system circuit diagram showing an embodiment of a timing control circuit in the block system shown in FIG. 1.

FIG. 21 shows an embodiment of the timing control circuit 19. The timing control circuit 19 comprises an oscillator 80 which generates a signal of 9.408 MHz, a ½ frequency divider 81, a switch 82, a 1/10 frequency divider 83, a 1/36 frequency divider 84, a 1/196 frequency divider 85, a ¼ frequency divider 86, a ½ frequency divider 87 and a decoder 88.

The output signal of the oscillator 80 is supplied to the ½ frequency divider 81 and a terminal S1 of the switch 82. An output signal of the ½ frequency divider 81 is supplied to a terminal S2 of the switch 82, and an output signal of the switch 82 is supplied to the 1/10 frequency divider 83. The switch 82 is connected to the terminal S1 during the recording and reproduction in the standard mode and during the reproduction in the half-speed mode of the present invention. On the other hand, the switch 82 is connected to the terminal S2 during the recording in the half-speed mode.

The frequency dividers 83 through 87 are successively and serially supplied with the output signal of the switch 82, and output signals of the frequency dividers 84 through 87 are supplied to the decoder 88. The first timing signal shown in FIG. 13(H) is obtained from the third bit of the output signal of the 1/196 frequency divider 85, and is supplied to the tracking reference signal detecting circuit 25 shown in FIG. 1 through a terminal 89. The second timing signal shown in FIG. 13(I) is obtained from the ½ frequency divider 87 through a terminal 91. The drum servo signal shown in FIGS. 14(A) and 15(A) is obtained from an upper bit of the output signal of the ¼ frequency divider 86 through a terminal 90.

The decoder 88 carries out predetermined signal processings such as AND, OR and delay operations to generate various other timing signals for controlling the operation of the block system shown in FIG. 1.

Figure 22:
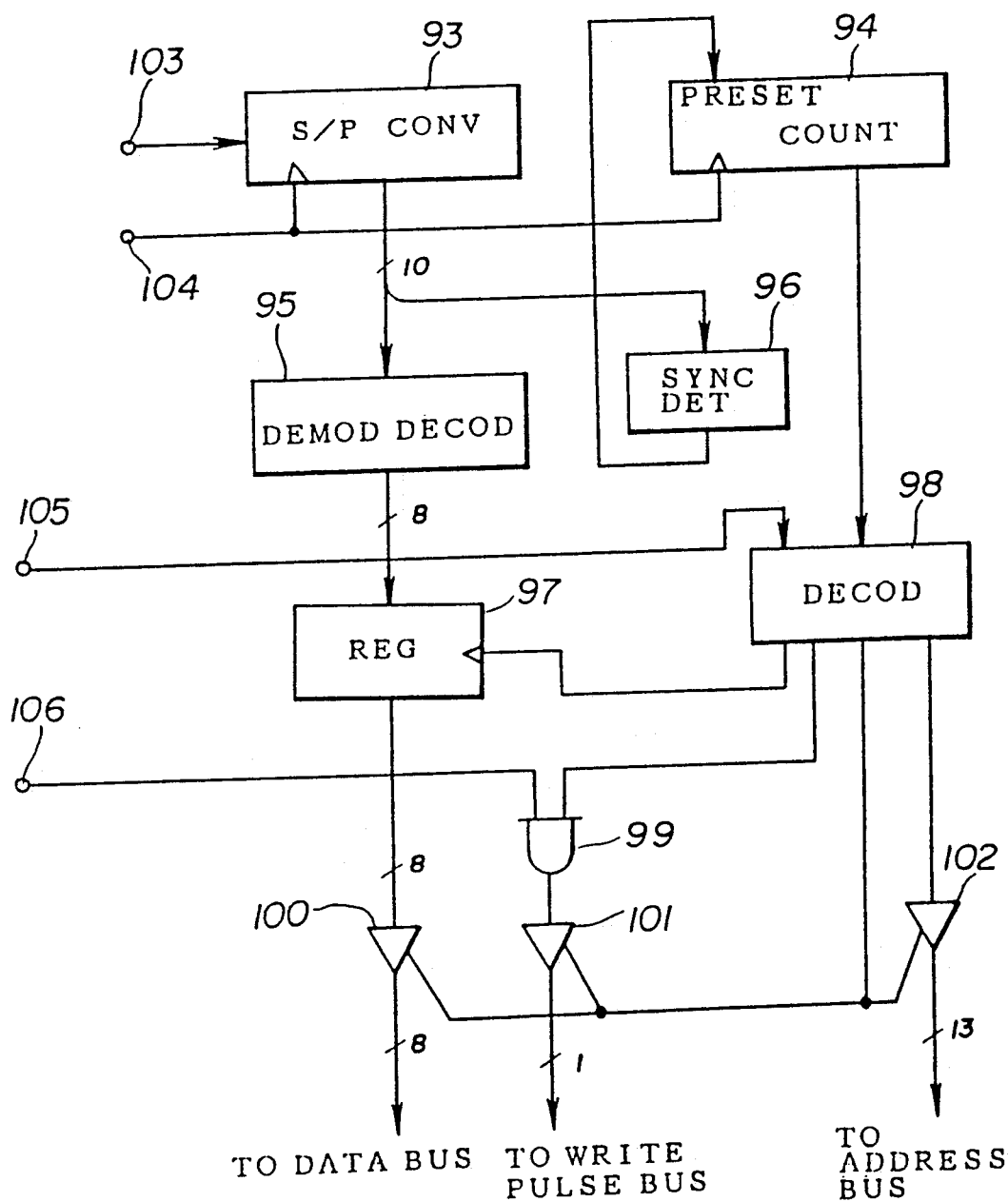
FIG. 22 is a system circuit diagram showing an embodiment of a demodulating circuit in the block system shown in FIG. 1.

FIG. 22 shows an embodiment of the demodulating circuit 27. The demodulating circuit 27 comprises a serial-to-parallel (S/P) converter 93, a counter 94, a demodulating decoder 95, a synchronizing signal detector 96, a register 97, a decoder 98, an AND circuit 99, and tri-state buffers 100 through 102.

The reproduced modulated PCM audio data from the wave equalizing circuit 23 shown in FIG. 1 is applied to a terminal 103 and is supplied to the S/P converter 93. The reproduced clock pulse signal from the PLL circuit 28 is applied to a terminal 104 and is supplied to clock terminals of the S/P converter 93 and the counter 94. An output signal of the S/P converter 93 is supplied to the register 97 through the demodulating decoder 95. The synchronizing signal detector 96 detects the synchronizing signal from the output signal of the S/P converter 93, and supplies an output detection signal to a preset terminal of the counter 94.

The drum servo signal shown in FIGS. 14(A) and 15(A) is applied to a terminal 105 and is supplied to the decoder 98 which is also supplied with a counted output signal of the counter 94. The decoder 98 supplies a clock signal to a clock terminal of the register 97 which stores the data.

An output signal of the register 97 is supplied to a data bus of the memory 29 through the buffer 100. The AND circuit 99 is supplied with an output signal of the decoder 98 and the second timing signal shown in FIG. 13(I) applied to a terminal 106. An output signal of the AND circuit 99 is supplied to a write pulse bus of the memory 29 through the buffer 101. An output signal of the decoder 98 is supplied to an address bus of the memory 29 through the buffer 102. The tri-state buffers 100 through 102 are controlled by an output signal of the decoder 98.

The present invention is not limited to this embodiment, and in FIG. 3, for example, the scans ①, ③ and ⑤ may be made by the rotary head having the gap of the positive azimuth angle and the scans ② and ④ may be made by the rotary having the gap of the negative azimuth angle. In this case, the reproduced signals obtained during the scans ① (or ⑤) and ④ are used. In addition, it may be easily understood from the description made in conjunction with FIGS. 9 and 10 that the reproduced tracking reference signal obtained from the beginning portion of the track during the scan ① or ⑤ and the reproduced tracking reference signal obtained from the ending portion of the track during the scan ④ are used in this case.

In other words, out of the four scans made by the two rotary heads with respect to two mutually adjacent tracks, the two successive scans (② and ③ in the embodiment and ④ and ⑤ or ① in the above described case) in which the reproduced signals are continuously obtained with a large level are selected. In addition, the reproduced tracking reference signals used are obtained from the ending portion of the track during the first of the two successive scans and from the beginning portion of the track during the second of the two successive scans.

Therefore, according to the first embodiment, the frequencies of the tracking reference signal and the modulated PCM audio data in the half-speed mode of the present invention can be made substantially the same as those in the standard mode, since the tape recorded in the conventional half-speed mode is played with the rotational speed of the rotary heads set to two times that at the time of the recording. For this reason, the analog filter for filtering the tracking reference signal, the PLL circuit for reading out the data, the wave equalizing circuit and the like can be used in common in the standard mode and the half-speed mode of the present invention. In addition, the coupling between the rotary heads and the reproducing amplifier through the rotary transformer can be improved, thereby improving the carrier-to-noise ratio of the reproduced signal. Moreover, because the rotational speed of the drum motor is the same for the standard mode and the half-speed mode of the present invention, it is possible to simplify the circuit construction of the drum motor control system. Furthermore, in the half-speed mode of the present invention, the error detecting and correcting operation is carried out at the same speed as that in the standard mode, and the error detecting and correcting operation is carried out two times. For this reason, the error detecting and correcting capability is improved compared to the conventional half-speed mode, and it is possible to obtain a reproduced audio signal of a high sound quality.

Figure 23:
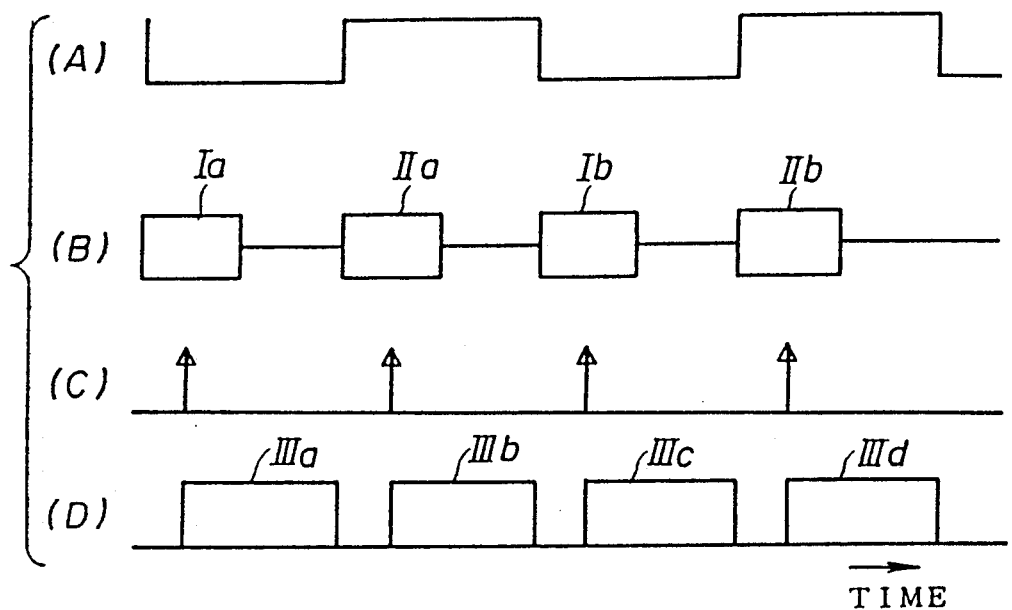
FIGS. 23(A) through 23(D) are timing charts for explaining unused time periods introduced during the error correcting operation.

Next, a description will be given on unused time periods introduced during the error correcting operation by referring to FIGS. 23(A) through 23(D). FIG. 23(A) shows the drum servo signal for controlling the drum motor 11. The drum servo signal has a repetition frequency of approximately 33 Hz and the drum motor 11 undergoes one revolution in one period of the drum servo signal. In the standard mode, reproduced signals Ia and Ib shown in FIG. 23(B) are obtained from one of the two rotary heads and reproduced signals IIa and IIb shown in FIG. 23(B) are obtained from the other of the two rotary heads. These reproduced signals are demodulated and stored in the memory 29. The timing control circuit 19 generates a timing signal (correction start signal) shown in FIG. 23(C) by delaying rising and falling edges of the drum servo signal a predetermined time, and this timing signal is supplied to the error detecting and correcting circuit 30. As a result, the error detecting and correcting circuit 30 detects and corrects the error in each of correcting time periods IIIa through IIId by reading out the respective reproduced signals Ia, IIa, Ib and IIb from the memory 29.

In the half-speed mode, the reproduced signals Ia and IIa shown in FIG. 23(B) are stored in the memory 29 for two revolutions of the rotary drum 14, and the reproduced signals Ib and IIb are not obtained. In addition, the reproduced signal Ia which is subjected to the error correction in the correcting time period IIIa is again subjected to the error correction in the correcting time period IIIc. Similarly, the reproduced signal IIa which is subjected to the error correction in the correcting time period IIIb is again subjected to the error correction in the correcting time period IIId. However, as may be seen from FIG. 23(D), there is a blank time period between the correcting time periods IIIb and IIIc, and also between the correcting time periods IIIc and IIId. In other words, the blank time period is not utilized effectively.

Figure 24:
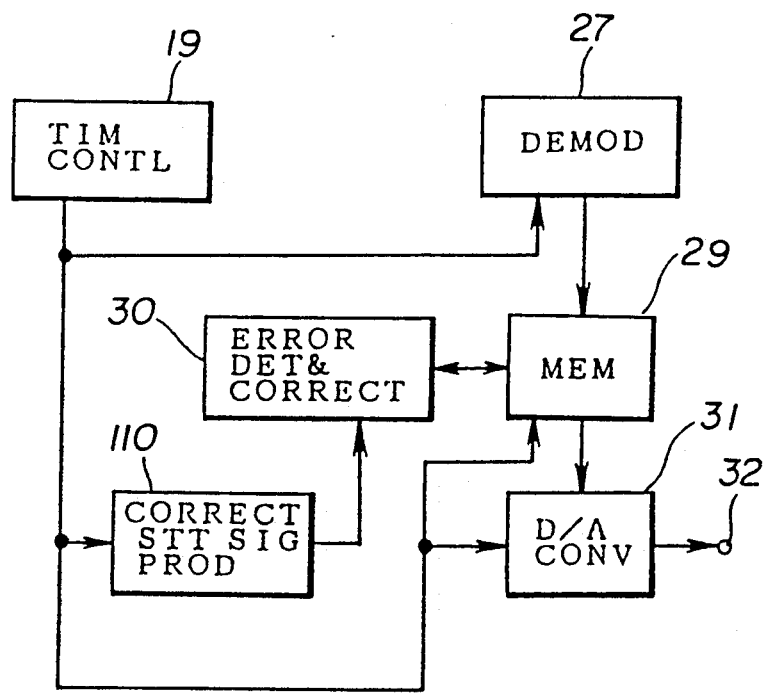
FIG. 24 is a system block diagram showing an essential part of a second embodiment of the rotary head type digital signal reproducing apparatus according to the present invention.

Next, a description will be given on a second embodiment of the rotary head type digital signal reproducing apparatus according to the present invention, wherein the blank time period is effectively utilized. FIG. 24 shows an essential part of the second embodiment, and in FIG. 24, those parts which are the same as those corresponding parts in FIG. 1 are designated by the same reference numerals, and a description thereof will be omitted. In the present embodiment, there is provided a correction start signal producing circuit 110. The correction start signal producing circuit 110 receives a timing signal from the timing control circuit 19 and produces a correction start signal which is supplied to the error detecting and correcting circuit 30 for controlling the error correcting timing thereof.

Figure 27:
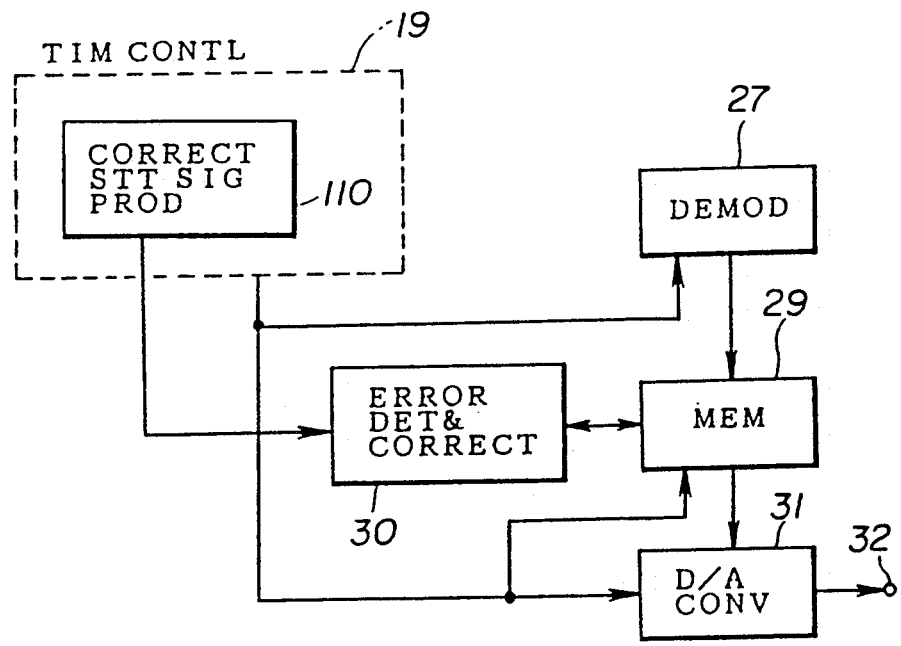
FIG. 27 is a system block diagram showing an essential part of a modification of the second embodiment of the rotary head type digital signal reproducing apparatus according to the present invention.

Although the correction start signal producing circuit 110 is illustrated as being a circuit independent of the timing control circuit 19, the correction start signal producing circuit 110 may be provided within the timing control circuit 19 as shown in FIG. 27 which shows an essential part of a modification of the second embodiment. In FIG. 27, those parts which are the same as those corresponding parts in FIG. 24 are designated by the same reference numerals, and a description thereof will be omitted. Since the operation of the block systems shown in FIGS. 24 and 27 are basically the same, only the description of the block system shown in FIG. 24 will be given hereunder.

Figure 25:
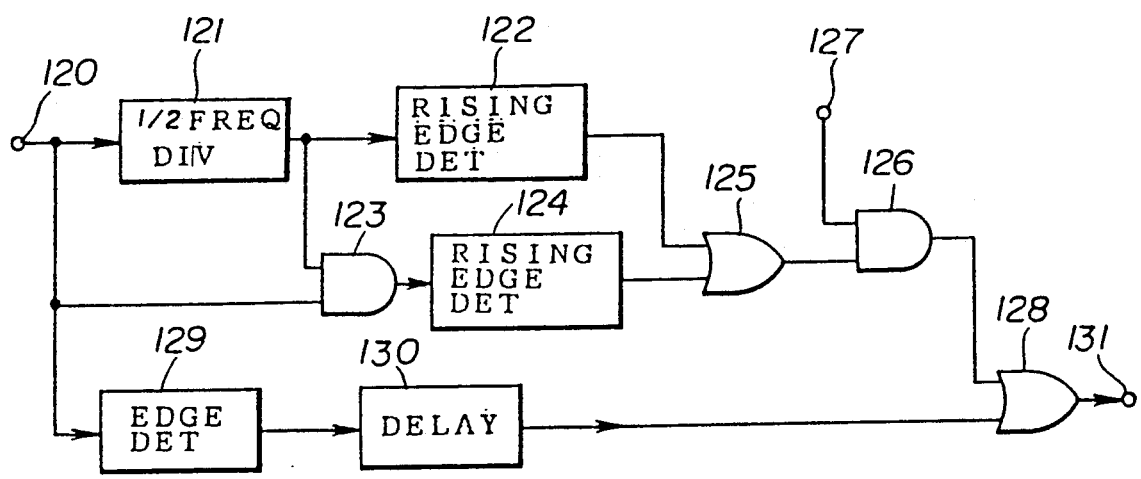
FIG. 25 is a system circuit diagram showing an embodiment of a correction start signal producing circuit in the block system shown in FIG. 24.

FIG. 25 shows an embodiment of the correction start signal producing circuit 110, and FIGS. 26(A) through 26(I) are timing charts for explaining the operation of the correction start signal producing circuit 110 shown in FIG. 25. In FIG. 25, a drum servo signal shown in FIG. 26(A) having a repetition frequency of approximately 33 Hz is applied to an input terminal 120 from the timing control circuit 19. The drum servo signal is frequency-divided by ½ in a ½ frequency divider 121 into a signal shown in FIG. 26(B). This signal from the frequency divider 121 is supplied to a rising edge detector 122 and one input terminal of a 2-input AND circuit 123. The drum servo signal is supplied to the other input terminal of the AND circuit 123. Thus, the AND circuit 123 supplies the drum servo signal to a rising edge detector 124 during the high-level period of the signal shown in FIG. 26(B).

The rising edge detectors 122 and 124 detect the rising edges of the incoming signals, and respectively produce detection pulse signals shown in FIGS. 26(C) and 26(D). The output detection pulse signals of the rising edge detectors 122 and 124 are passed through a 2-input OR circuit 125, and an output pulse signal of the OR circuit 125 is supplied to one input terminal of a 2-input AND circuit 126. A control signal having a low-level in the standard mode and a high level in the half-speed mode is applied to a terminal 127 and is supplied to the other input terminal of the AND circuit 126. As a result, the AND circuit 126 produces the output pulse signal of the OR circuit 125 only during the half-speed mode. An output pulse signal of the AND circuit 126 is supplied to one input terminal of a 2-input OR circuit 128.

An edge detector 129 detects the rising and falling edges of the drum servo signal from the input terminal 120. An output detection pulse signal of the edge detector 129 is delayed by approximately 1.89 msec in a delay circuit 130 into a pulse signal shown in FIG. 26(E). This pulse signal shown in FIG. 26(E) is supplied to the other input terminal of the OR circuit 128. The OR circuit 128 produces a correction start signal and this correction start signal is supplied to the error detecting and correcting circuit 30 shown in FIG. 24 through an output terminal 131.

In the standard mode when all of the reproduced signals Ia, IIa, Ib and IIb are stored in the memory 29 as shown in FIG. 26(F), the correction start signal has a waveform shown in FIG. 26(E) because the low-level control signal is applied to the terminal 127. Hence, as shown in FIG. 26(G), the reproduced signals Ia, IIa, Ib and IIb are subjected to the error correction in the error detecting and correcting circuit 30 during the first correcting time periods IIIa through IIId.

On the other hand, only the reproduced signals Ia and IIa are stored in the memory 29 in the half-speed mode. In this case, the correction start signal has a waveform shown in FIG. 26(H). During the first one revolution of the rotary drum 14, a first error correction is carried out with respect to the reproduced signals Ia and IIa during the first correcting time periods IIIa and IIIb. During the second one revolution of the rotary drum 14, a second error correction is carried out during second correcting time periods IVa and IVb with respect to a portion of the reproduced signals Ia and IIa which have been corrected in the first correcting time periods IIIa and IIIb, and furthermore, a third error correction is carried out during third correcting time periods IIIc and IIId with respect to the reproduced signals Ia and IIa which have been corrected in the first and second correcting time periods IIIa, IIIb, IVa and IVb.

Therefore, the time periods IVa and IVb which were conventionally unused are effectively utilized for the error correction in the present embodiment and the modification thereof. In other words, the error correction is carried out three times (although the error correction is carried out only for a portion of the reproduced signals during the second correcting time periods). As a result, compared to the first embodiment described before, the error correcting capability of the present embodiment is further improved, and it is possible to obtain a reproduced audio signal of a high sound quality.

In the present embodiment and the modification thereof, both the time periods IVa and IVb are utilized for the error correction. However, it is possible to utilize only one of the time periods IVa and IVb.

However, even according to the embodiments described heretofore, it is impossible to completely eliminate the third and fourth problems described in the introductory part of the present specification. Hence, a description will be given hereunder on a third embodiment of the rotary head type digital signal reproducing apparatus according to the present invention which can completely eliminate the first through fourth problems described before. But first, a description will be given on an example of the conventional rotary head type digital signal recording and reproducing apparatus by referring to FIG. 28, so as to facilitate the understanding of the present embodiment.

Figure 28:
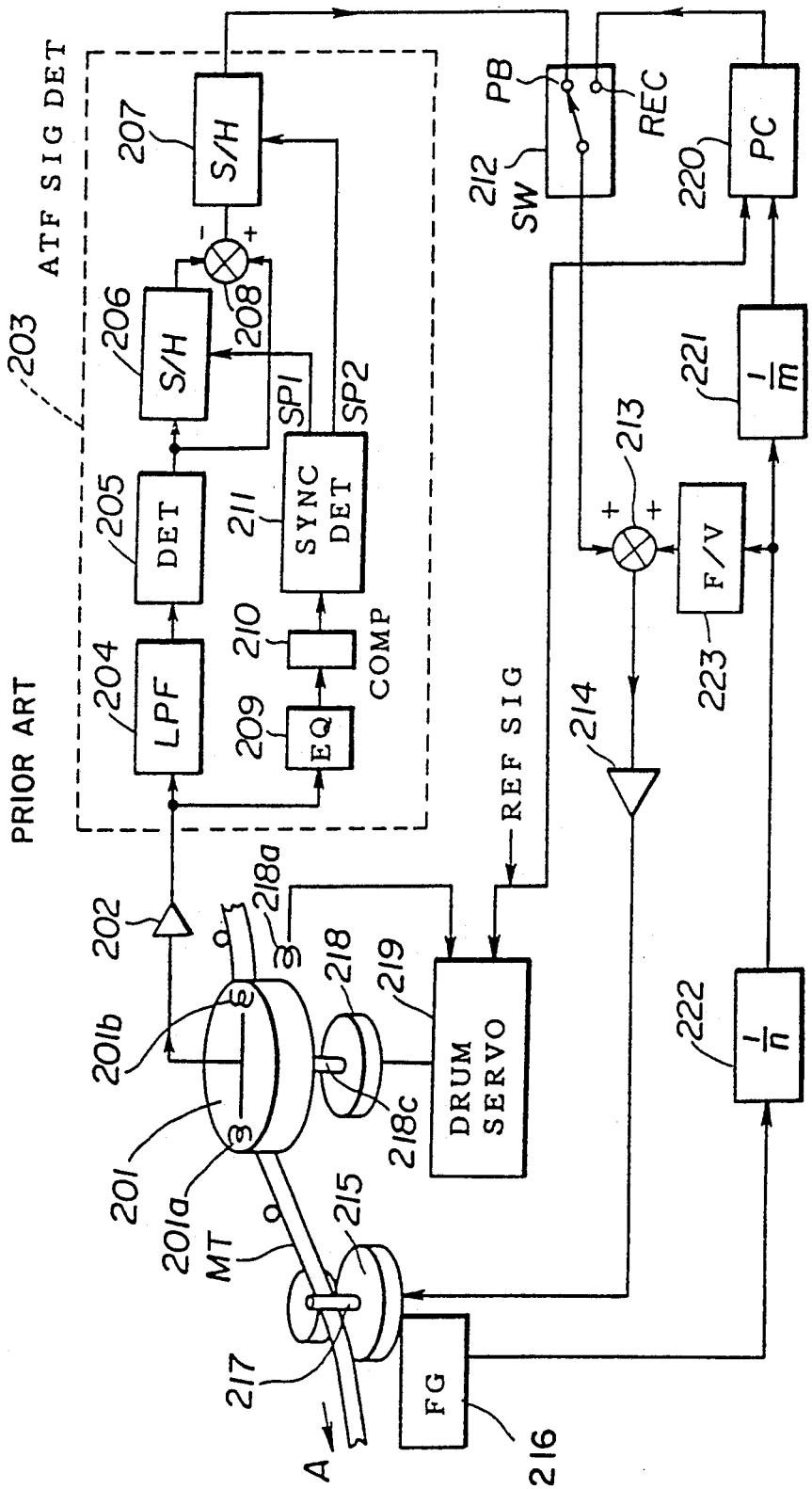
FIG. 28, is a system block diagram showing an example of the conventional rotary head type digital signal recording and reproducing apparatus.

In FIG. 28, the recording and reproducing apparatus comprises a rotary drum 201, a reproducing amplifier 202, an ATF (Automatic Track Find) signal detecting part 203, a switch 212, an adder 213, a motor driving circuit 214, a capstan motor 215, a frequency generator 216, a capstan 217, a drum motor 218, a drum servo circuit 219, a phase comparator 220, a sensor 218a, a 1/m frequency divider 221, a 1/n frequency divider 222, and a frequency-to-voltage (F/V) converter 223. The ATF signal detecting part 203 comprises a lowpass filter 204, an envelope detecting circuit 205, sample and hold (S/H) circuits 206 and 207, a subtracting circuit 208, an equalizer circuit 209, a comparator 210 and a synchronizing signal detecting circuit 211.

A rotary shaft 218c of the drum motor 218 is fixed to a central portion of the rotary drum 201. Rotary magnetic heads 201a and 201b are mounted at diametrical positions on a rotational plane of the rotary drum 201. A magnetic tape MT is wrapped obliquely around an outer peripheral surface of the rotary drum 201 for an angular range of approximately 90°. The tape MT is transported in a direction A in a state pinched between the capstan 217 and a pinch roller. The heads 201a and 201b have gaps of mutually different azimuth angles, and these heads 201a and 201b have a track width greater than a track width of the recorded tracks on the tape MT. For example, the track width of the heads 201a and 201b are 1.5 times the track width of the recorded tracks. The rotary shaft 218c rotates unitarily with the rotary drum 201.

A reproduced signal which is reproduced from the tape MT by the head 201a (or 201b) is supplied to the ATF signal detecting part 203 through the reproducing amplifier 202. The reproduced signal is passed through the equalizer circuit 209 and the comparator 210 and is supplied to the synchronizing signal detecting circuit 211 wherein a synchronizing signal $f_S$ of the ATF signal is detected from the reproduced signal. The synchronizing signal detecting circuit 211 produces sampling pulse signals SP1 and SP2 based on the detected synchronizing signal $f_S$. The sampling pulse signal SP1 is supplied to the S/H circuit 206, while the sampling pulse signal SP2 is supplied to the S/H circuit 207.

The reproduced signal from the reproducing amplifier 202 is also supplied to the envelope detecting circuit 205 through the lowpass filter 204. The envelope of the reproduced signal is detected in the envelope detecting circuit 205, and an output detection signal of the envelope detecting circuit 205 is supplied to the S/H circuit 206 which samples and holds the detection signal with a timing determined by the sampling pulse signal SP1. A sampled and held signal from the S/H circuit 206 is supplied to a subtracting input terminal of the subtracting circuit 208. The output detection signal of the envelope detecting circuit 205 is also supplied to an adding input terminal of the subtracting circuit 208. Thus, the subtracting circuit 208 outputs an error signal which is obtained by subtracting the sampled and held signal from the detection signal, and this error signal is supplied to the S/H circuit 207. The S/H circuit 207 samples and holds the error signal with a timing determined by the sampling pulse signal SP2. As a result, an ATF error signal is obtained from the S/H circuit 207 as an output signal of the ATF signal detecting part 203.

The ATF error signal from the ATF signal detecting part 203 is applied to a terminal PB of the switch 212 and is supplied to an adding terminal of the adder 213, since the switch 212 is connected to the terminal PB in a play mode and to a terminal REC in a recording mode. The adder 213 adds the ATF error signal from the switch 212 and an output signal of the F/V converter 223, and supplies an added signal to the capstan motor 215 through the motor driving circuit 214 which amplifies the added signal. Therefore, the rotational speed of the capstan 217 is controlled so that the tape MT is transported at a tape transport speed of the half-speed mode, for example.

The frequency generator 216 generates a signal having a frequency dependent on the rotational speed of the capstan 217, and the output signal of the frequency generator 216 is frequency-divided by 1/n in the 1/n frequency divider 222. An output signal of the 1/n frequency divider 222 is supplied to the 1/m frequency divider 221 and the F/V converter 223. Hence, the so-called capstan servo operation is carried out.

The sensor 218a generates a drum pulse signal having a frequency dependent on the rotational speed of the rotary drum 201, and the output drum pulse signal of the sensor 218a is supplied to one input terminal of the drum servo circuit 219. A reference signal (drum servo signal) is supplied to the other input terminal of the drum servo circuit 219 and to the phase comparator 220. The phase comparator 220 produces a phase error signal dependent on a phase difference between the reference signal and an output signal of the 1/m frequency divider 221, and this phase error signal is applied to the terminal REC of the switch 212. Hence, in the recording mode, this phase error signal from the terminal REC of the switch 212 is supplied to the adding terminal of the adder 213.

In the standard mode, the heads 201a and 201b rotate at a rotational speed of 2000 rpm, for example, and the heads 201a and 201b also rotate at this rotational speed of 2000 rpm in the half-speed mode of the present invention for the same reasons as the embodiments described before. In the half-speed mode of the present invention, the tape transport speed of the tape MT is set to one-half the tape transport speed in the standard mode.

Figure 29:
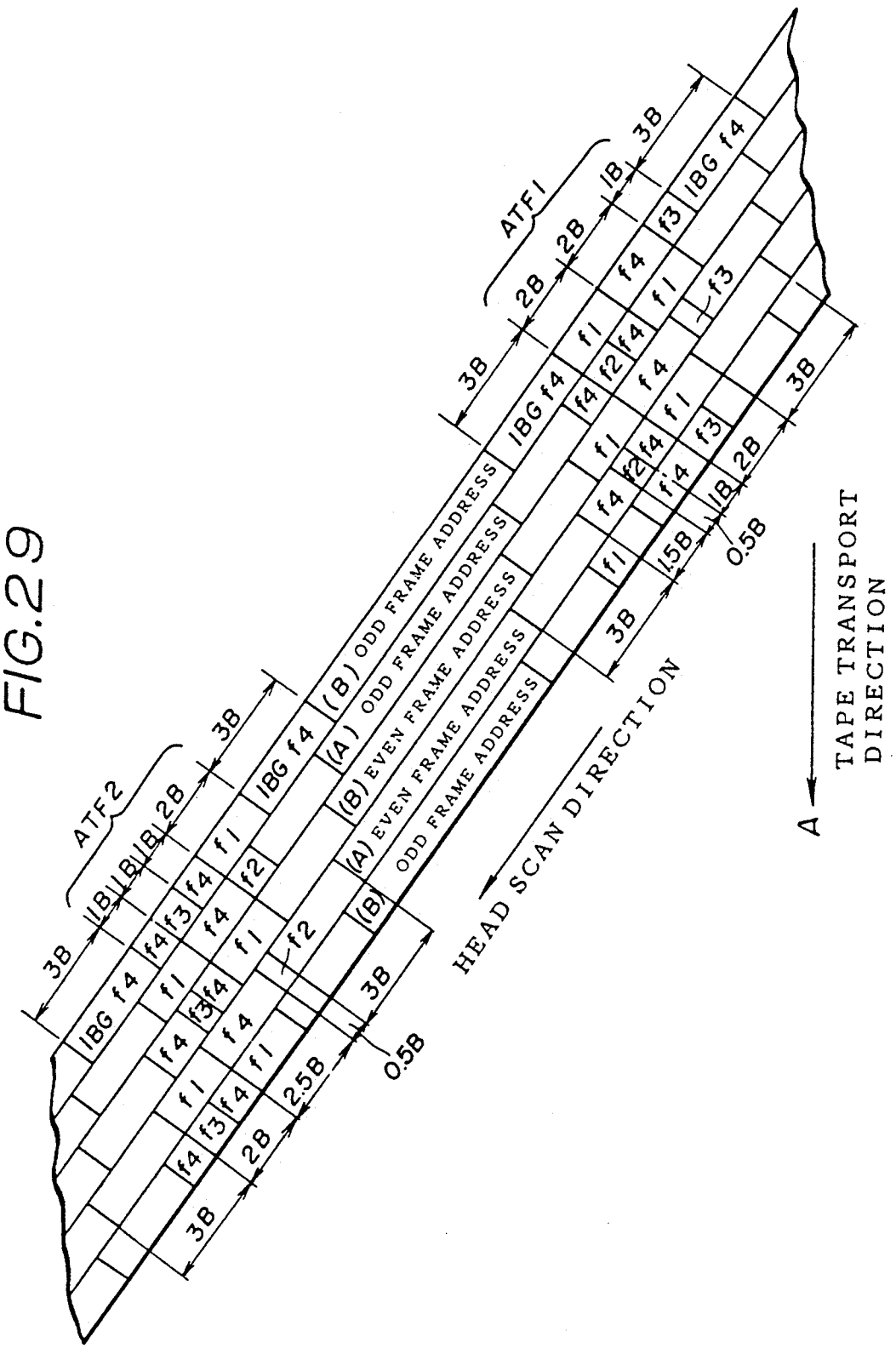
FIG. 29 shows a track pattern which completes for every four tracks on a magnetic tape.

The tape MT recorded on the recording and reproducing apparatus shown in FIG. 28 has a track pattern shown in FIG. 29 which completes in every four tracks. The PCM audio data amounting to a predetermined time is recorded in each intermediate track portion indicated by "(B) ODD FRAME ADDRESS", "(A) EVEN FRAME ADDRESS", "(B) EVEN FRAME ADDRESS", and "(A) ODD FRAME ADDRESS". The ATF signal (tracking reference signal) is recorded in each predetermined track portion ATF1 located between the beginning of each track and the intermediate track portion of the track, and is also recorded in each predetermined track portion ATF2 located between the intermediate track portion of each track and the end of the track. The ATF signal is recorded according to a set industry standard, and a detailed description on the track pattern shown in FIG. 29 will be omitted in the present specification. In FIG. 29, B denotes a signal length of one block.

Figure 30:
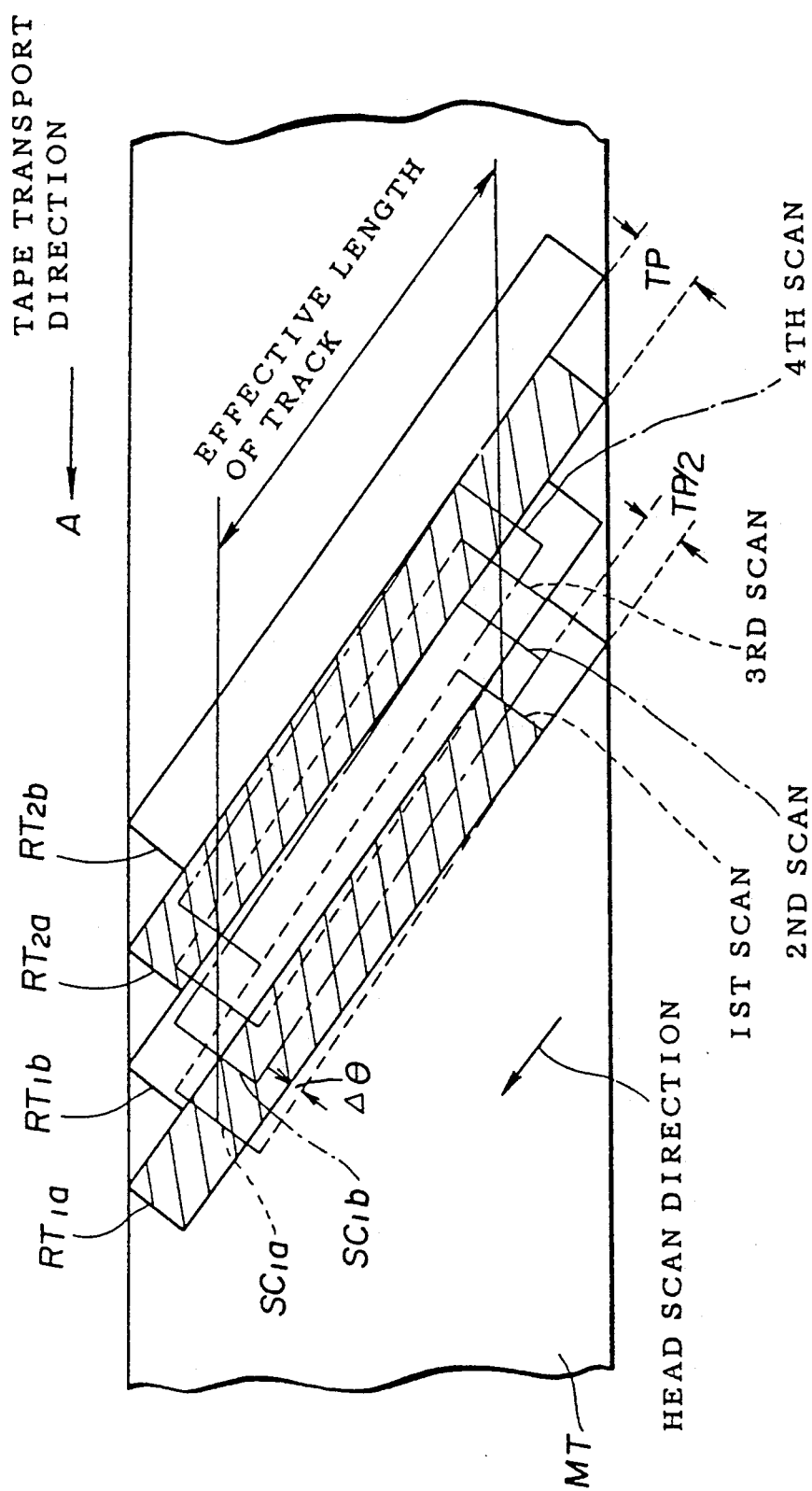
FIG. 30 is a diagram showing scanning loci of rotary magnetic heads in a half-speed mode of the present invention.

FIG. 30 shows scanning loci of the heads 201a and 201b when scanning in the half-speed mode of the present invention the tracks on the tape MT recorded in the conventional half-speed mode. The recorded tracks are formed without a guardband between two mutually adjacent tracks as shown in FIG. 30. As described before, the rotational speed of the heads 201a and 201b in the half-speed mode of the present invention is the same as that in the standard mode, but the tape transport speed of the tape MT one-half the tape transport speed in the standard mode. For this reason, the scanning loci of the heads 201a and 201b in the half-speed mode of the present invention do not coincide with the scanning loci of corresponding rotary magnetic heads in the conventional half-speed mode, and a tracking offset $\Delta\theta$ occurs between a recorded track $RT_{1a}$ and a scanning locus $SC_{1a}$ of the head 201a and between a recorded track $RT_{1b}$ and a scanning locus $SC_{1b}$ of the head 201b, for example. In other words, a total of four scans are made by the heads 201a and 201b with respect to the two mutually adjacent tracks $RT_{1a}$ and $RT_{1b}$, for example.

For example, the tracks identified by RT with a subscript "a" is recorded by a first rotary magnetic head having a gap with a positive azimuth angle, and the tracks identified by RT with a subscript "b" is recorded by a second rotary magnetic head having a gap with a negative azimuth angle. The azimuth angles of the first and second rotary magnetic heads are the same as those of the heads 201a and 201b, respectively.

The reproduced signal alternately obtained from the two heads 201a and 201b and having a frequency higher than a predetermined value is the signal reproduced from the intended track which has been recorded by the rotary magnetic head having the gap of the same azimuth angle as the reproducing head. The level of this reproduced signal is approximately proportional to the contact width of the heads 201a and 201b on the intended track.

Out of the four scans made by the heads 201a and 201b with respect to the two mutually adjacent tracks $RT_{1a}$ and $RT_{1b}$, the level of the reproduced signals obtained by the first and second scans is large compared to the level of the reproduced signals obtained by the third and fourth scans.

As described before, the ATF signal is recorded in the predetermined track portions immediately after the beginning of each track and immediately before the end of each track. The ATF signal comprises a pilot signal $f_P$ (indicated by f1 in FIG. 29) and the synchronizing signal $f_S$ (indicated by f2 and f3 in FIG. 29) for controlling the sample and hold timing of the detected signal of the ATF signal. The frequency of the synchronizing signal $f_S$ is set to a relatively high frequency so that a sufficient azimuth loss effect would occur. For example, the synchronizing signal $f_S$ (f2) recorded on one of the two mutually adjacent tracks has a frequency of approximately 522 kHz while the synchronizing signal $f_S$ (f3) recorded on the other of the two mutually adjacent tracks has a frequency of 784 kHz. On the other hand, the frequency of the pilot signal $f_P$ is set to a constant low frequency so that only a small azimuth loss effect would occur and the pilot signal $f_P$ would be reproduced as crosstalk from an adjacent track. For example, the pilot signal $f_P$ has a frequency of approximately 130 kHz.

In each predetermined track portion where the ATF signal is recorded, the synchronizing signal $f_S$ is recorded for a certain time in a synchronizing signal recording section, an erase signal $f_e$ (indicated by f4 in FIG. 29) of approximately 1.57 MHz, for example, is recorded in an erase signal recording section provided after the synchronizing signal recording section for erasing the previous signal, and the pilot signal $f_P$ is recorded for a certain time in a pilot signal recording section provided after the erase signal recording section. The signal recording sections are arranged so that the pilot signal recording section in one track is adjacent to the erase signal recording section in a track immediately preceding the one track, and the synchronizing signal recording sections and the pilot signal recording sections are not adjacent to each other between two mutually adjacent tracks. As shown in FIG. 29 which is known, a pattern of these signal recording sections is cyclic, i.e., the specific order and the time length of each recording section on one track recur every fourth track.

During the first scan when the track $RT_{1a}$ recorded with the ATF signal described heretofore is scanned by the head 201a having the gap of the same azimuth angle as the rotary magnetic head which recorded the track $RT_{1a}$ but with the rotational speed of the head 201a set to two times that at the time of the recording, the head 201a scans the entire track $RT_{1a}$ and also a portion of the tape MT preceding the track $RT_{1a}$ and a portion of the track $RT_{1b}$ subsequent to the track $RT_{1a}$. Then, during the second scan, the head 201b scans approximately one-half of the track $RT_{1a}$ and a large portion of the track $RT_{1b}$ During the third scan, the head 201a scans all of the track $RT_{1b}$ and portions of the tracks $RT_{1a}$ and $RT_{2a}$. Finally, during the fourth scan, the head 201b scans a large portion of the track $RT_{2a}$ and approximately one-half of the track $RT_{1b}$.

As described before, the synchronizing signal $f_S$ used for controlling the sample and hold timing of the detection signal of the AFT signal is reproduced only from a home track, where the home track refers to the track which is scanned by the head having the gap of the same azimuth angle as that of the rotary magnetic head which formed the track at the time of the recording. On the other hand, the pilot signal $f_P$ is not only reproduced from the home track but is also reproduced as crosstalk from tracks adjacent to the home track.

In addition, the scanning loci of the heads 201a and 201b in the half-speed mode of the present invention do not coincide with the scanning loci of corresponding rotary magnetic heads in the conventional half-speed mode, and as described before, the tracking offset $\Delta\theta$ occurs between the scanning locus of the head and the home track. There is a tracking offset $\Delta\theta$ at the predetermined track portion ATF1 at the beginning of the track, and there is a tracking offset $-\Delta\theta$ at the predetermined track portion ATF2 at the end of the track. Therefore, the effects of the tracking offset becomes zero when the ATF error signal obtained with the tracking offset $+\Delta\theta$ and the ATF error signal obtained with the tracking offset $-\Delta\theta$ are averaged.

Accordingly, in the present embodiment, when four scans are made in the half-speed mode of the present invention with respect to two mutually adjacent tracks, the ATF error signal is produced by detecting lengths of the synchronizing signals $f_S$ within the ATF signal reproduced from the predetermined track portion at the end of the track during the first scan and within the ATF signal reproduced from the predetermined track portion at the beginning of the track during the second scan. After the third and fourth scans are made, next four scans are similarly made with respect to next two mutually adjacent tracks. The lengths of the synchronizing signals $f_S$ tracks. The lengths of the synchronizing signals $f_S$ within the ATF signal reproduced from the predetermined track portion at the end of the track during the first of the next four scans and within the ATF signal reproduced from the predetermined track portion at the beginning of the track during the second of the next four scans are detected, and the synchronizing signals $f_S$ are used to renew the ATF error signal only when the lengths of the two synchronizing signals $f_S$ coincide. Similar operations are repeated for every four scans made with respect to each two mutually adjacent tracks which follow. As a result, it is possible to always ensure a satisfactory tracking control in the play mode even when an external disturbance exists.

Figure 31:
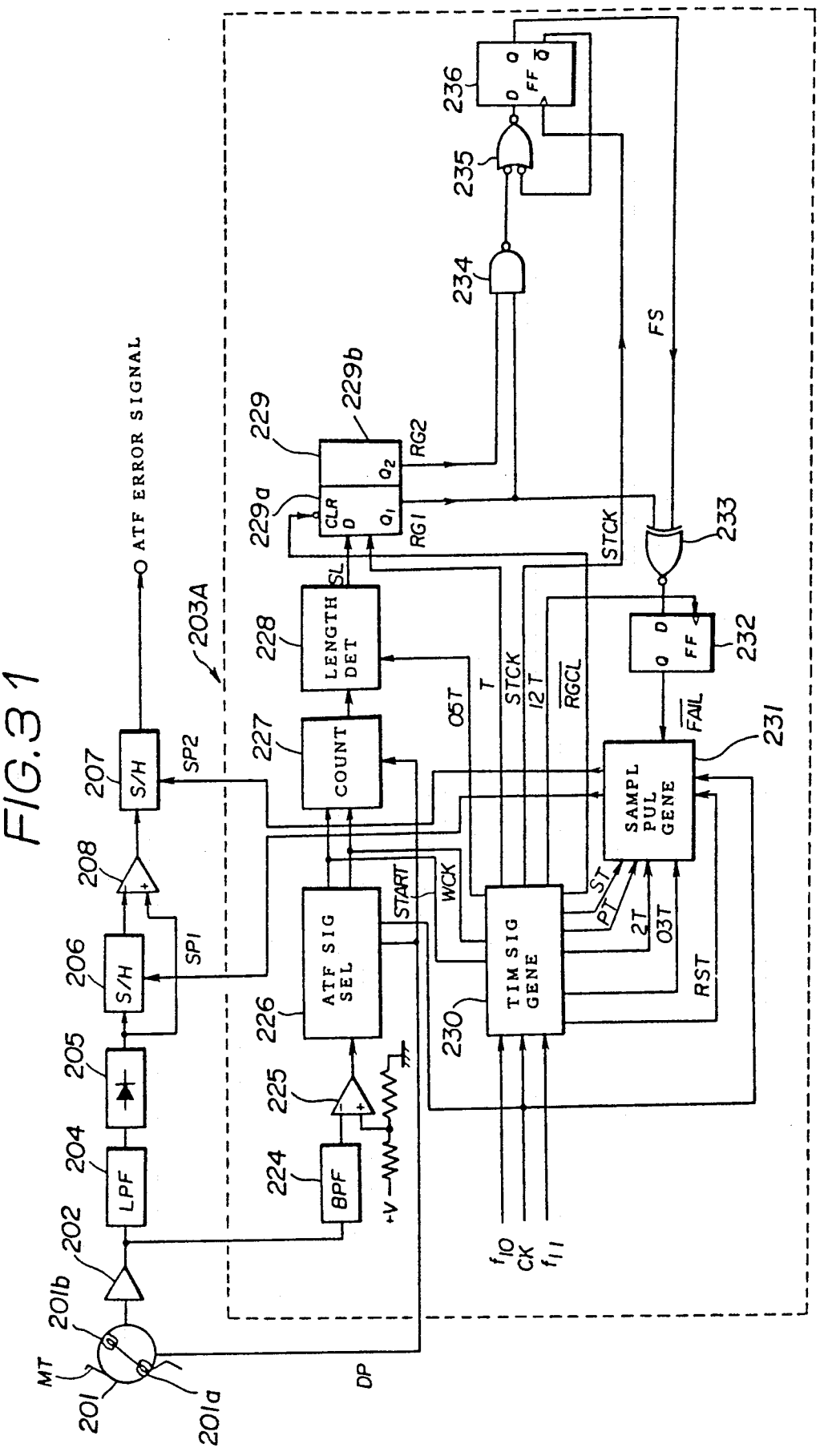
FIG. 31 is a system block diagram showing an essential part or a third embodiment of the rotary head type digital signal reproducing apparatus according to the present invention.

FIG. 31 is a system block diagram showing an essential part of the third embodiment of the rotary head type digital signal reproducing apparatus according to the present invention, and FIGS. 32(A) through 32(H), 33(A) through 33(G) and 34(A) through 34(G) are time charts for explaining the operation of the block system shown in FIG. 31. In FIG. 31, those parts which are essentially the same as those corresponding parts in FIG. 28 are designated by the same reference numerals, and a description thereof will be omitted.

An ATF signal detecting circuit 203A constitutes the essential part of the present embodiment, and in FIG. 4, the ATF signal detecting circuit 203A comprises a bandpass filter 224, a comparator 225, an ATF signal selecting circuit 226, a wave counter 227, a signal length detecting circuit 228, a shift register 229, a timing signal generator 230, a sampling pulse generator 231, D-type flip-flops 232 and 236, an exclusive-OR circuit 233, a NAND circuit 234 and an invert-NOR circuit 235. The shift register 229 has a two-stage construction with registers 229a and 229b, and produces a parallel output responsive to a serial input.

Reproduced signals TA(n), TB(n), ... shown in FIG. 32(A) obtained from the heads 201a and 201b through the reproducing amplifier 202 are supplied to the bandpass filter 224 which separates the synchronizing signal $f_S$. The reproduced signals TA(n), TB(n), ... are also supplied to the lowpass filter 204 which separates the pilot signal $f_P$. The reproduced synchronizing signal $f_S$ from the bandpass filter 224 is applied to an inverting input terminal of the comparator 225 and is compared with a predetermined voltage applied to a non-inverting input terminal of the comparator 225. An output error voltage of the comparator 225 dependent on a voltage difference between the two compared voltages is supplied to the ATF signal selecting circuit 226.

The ATF signal selecting circuit 226 selects and extracts the synchronizing signal $f_S$ (f or f3) reproduced from either the predetermined track portion at the end of the track during the first of the four successive scans or the predetermined track portion at the beginning of the track during the second of the four successive scans, responsive to a drum pulse signal DP and a clock pulse signal CK. As a result, synchronizing signals $f_S$ (f2) reproduced from the predetermined track portions located at the ends of the tracks for the reproduced signals TA(n), TA(n+1), and the synchronizing signals $f_S$ (f3) reproduced from the predetermined track portions located at the beginnings of the tracks for the reproduced signals TB(n), TB(n+1), ... are obtained. Their positional relationship is shown in FIG. 32(A) and (B).

Figure 35:
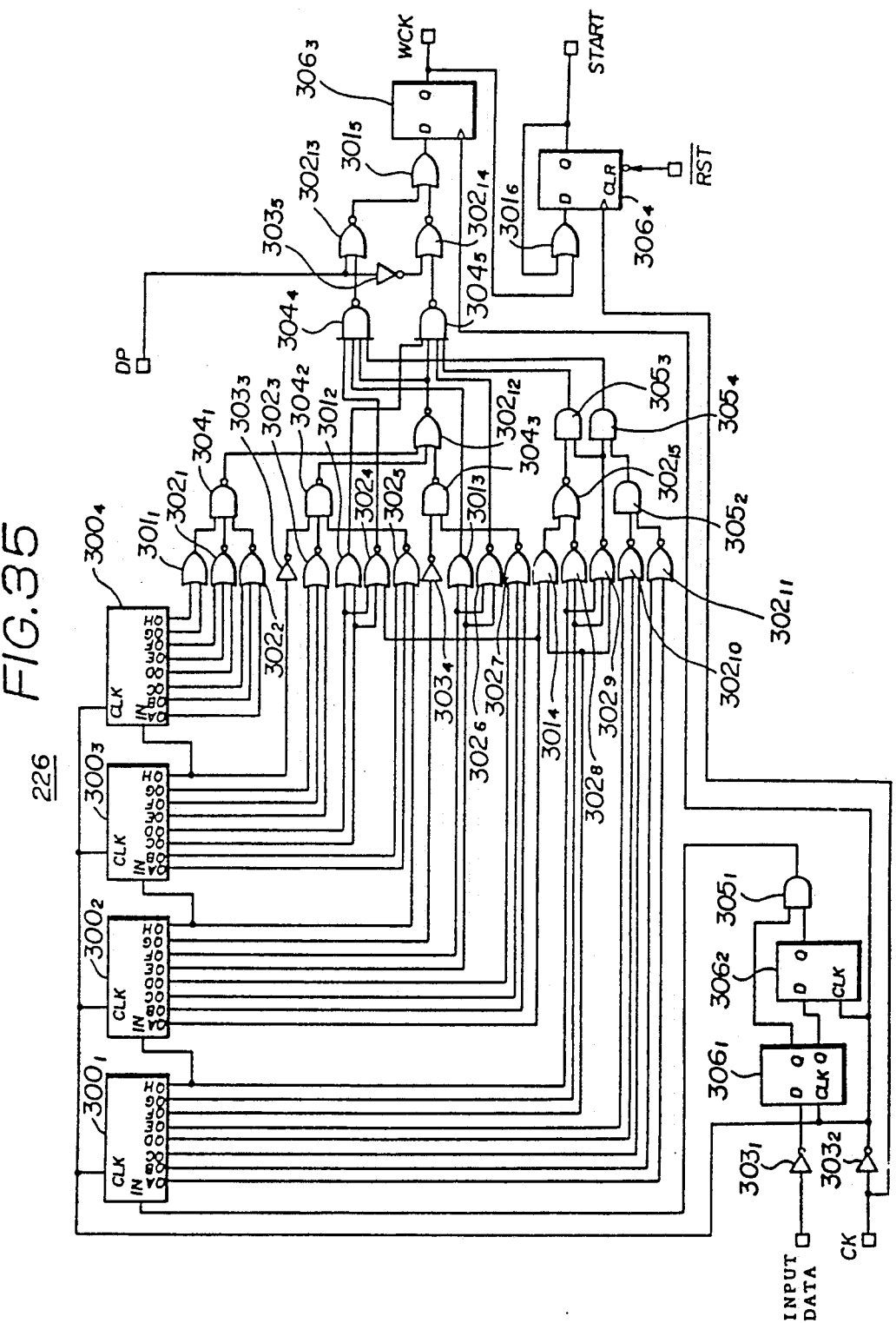
FIG. 35 is a circuit diagram showing an embodiment of an ATF signal selecting circuit in the block system shown in FIG. 31.

FIG. 35 shows an embodiment of the ATF signal selecting circuit 226. The ATF signal 226 comprises serial-input with 8-bit parallel-output shift registers $300_1$ through $300_4$, OR gates $301_1$ through $301_6$, NOR gates $302_1$ through $302_{15}$, inverters $303_1$ through $303_4$, NAND gates $304_1$ through $304_5$, AND gates $305_1$ through $305_4$, and D-type flip-flops $306_1$ through $306_4$ which are connected as shown. An output signal WCK of the flip-flop $306_3$ is either the synchronizing signal $f_S$ (f2) reproduced from the predetermined track portions located at the ends of the tracks from which the reproduced signals TA(n), TA(n+1), ... are obtained, or the synchronizing signal $f_S$ (f3) reproduced from the predetermined track portions located at the beginnings of the tracks from which the reproduced signals TB(n), TB(n+1), ... are obtained. On the other hand, an output signal START of the flip-flop $306_4$ indicates a start of the signal WCK (f2 or f3).

Figure 36:
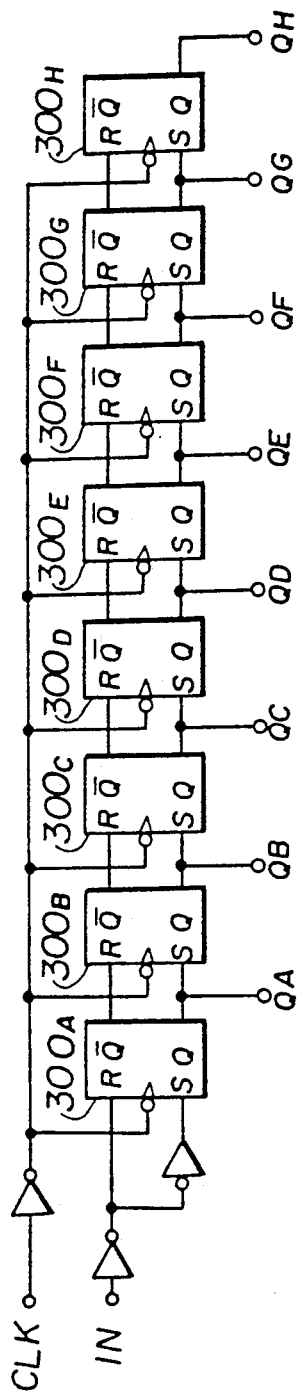
FIG. 36 is a circuit diagram showing an embodiment of a serial-input parallel-output shift register in the circuit shown in FIG. 35.

As shown in FIG. 36, each of the shift registers $300_1$ through $300_4$ may be constituted by SR flip-flops $300_A$ through $300_H$ and inverters. In FIG. 36, those parts which are the same as those corresponding parts in FIG. 35 are designated by the same reference characters.

The signals WCK and START from the ATF signal selecting circuit 226 are supplied to the wave counter 227. The wave counters 227 is supplied with the drum pulse signal DP, and can hence detect whether or not the synchronizing signal $f_S$ being counted is f2 or f3. The number of counted waves of f2 is approximately 20 in one block (1B) and approximately 10 in 0.5 block (0.5B). On the other hand, the number of counted waves of f3 is approximately 30 in one block and approximately 15 in 0.5 block. A counted value dependent on the signal length (block length) of the synchronizing signal $f_S$ is supplied to the signal length detecting circuit 228 from the wave counter 227. Based on the counted value from the wave counter 227, the signal length detecting circuit 228 detects the length of the synchronizing signal $f_S$, that is, whether the signal length of the synchronizing signal $f_S$ is one block or 0.5 block, responsive to a signal 05T from the timing signal generator 230. A signal length detection signal SL indicative of the signal length is supplied to the shift register 229 from the signal length detecting circuit 228.

The signal START, the signal WCK ($f_S$) shown in FIG. 32(B), the clock signal CK, a signal f10 shown in FIG. 32(C), a signal f12 shown in FIG. 32(D), and a signal f11 shown in FIG. 32(E) are supplied to the timing signal generator 230. The timing signal generator 230 generates a signal T shown in FIG. 32(F), a signal STCK shown in FIG. 32(G), a signal $\overline{RGCL}$ shown in FIG. 32(H), and signals 03T, 05T, T, 12T and 2T.

The signal f10 has a frequency of 16.6 Hz and has a period of two revolutions of the rotary drum 201. The signal f11 has a frequency of 133.3 Hz which is eight times the frequency of the signal f10. The signals 03T, 05T, T, 12T and 2T are pulse signals which have a constant pulse width and respectively start approximately 0.3 block, 0.5 block, one block, 1.2 block and two blocks after the signal START, that is, the detection of the first wave of the synchronizing signal $f_S$. The signal STCK is supplied to the flip-flop 236 so as to forcibly set it to "0" when both output signals RG1 and RG2 of the registers 229a and 229b are "1", and to otherwise invert the state of the flip-flop 236 with every incoming signal STCK. The signal $\overline{RGCL}$ is used to clear the shift register 229. The signals STCK and $\overline{RGCL}$ have a period of two revolutions of the rotary drum 201.

Figure 37A:
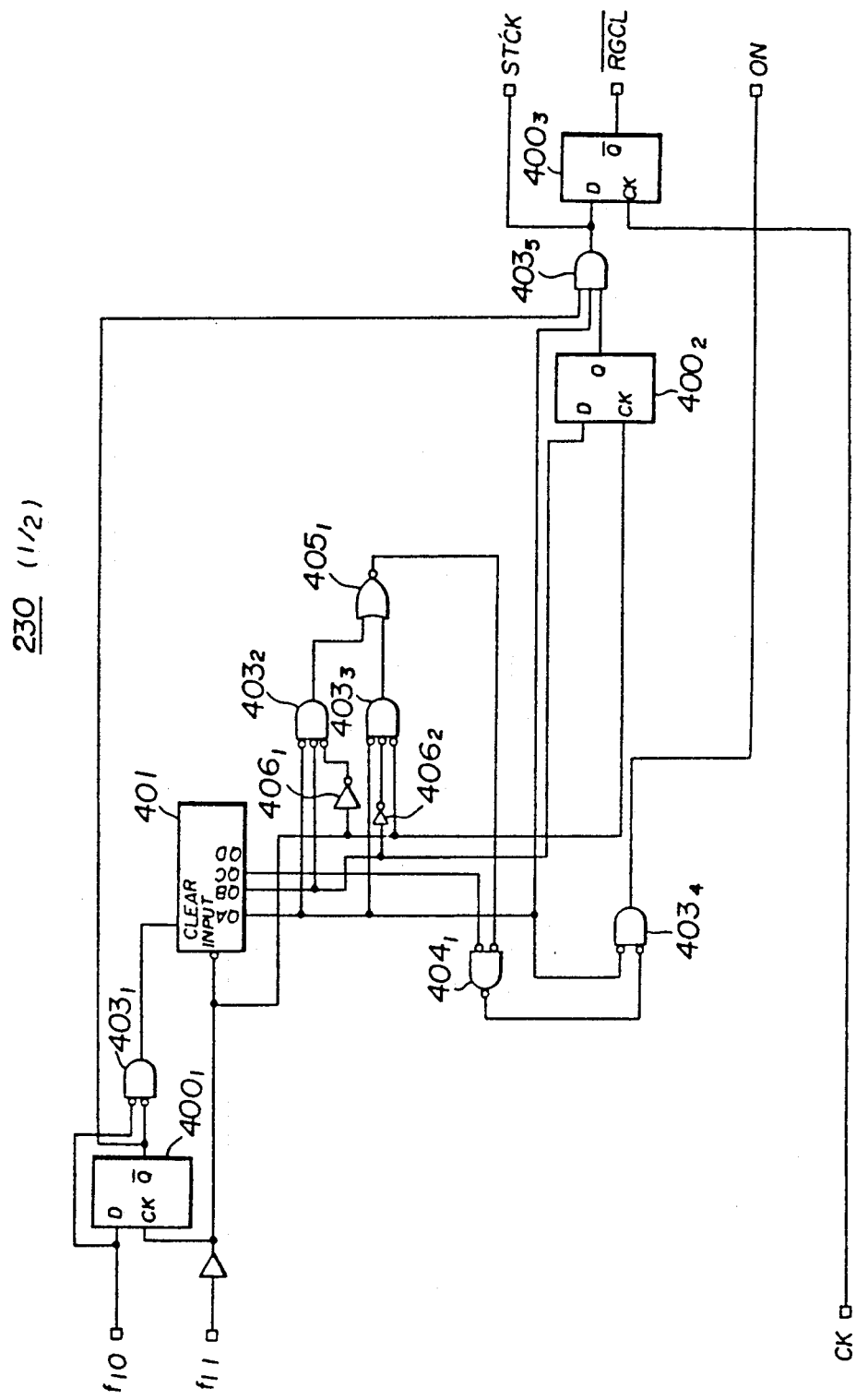
FIGS. 37A and 37B are circuit diagrams showing an embodiment of a timing signal generator in the block system shown in FIG. 31.
Figure 37B:
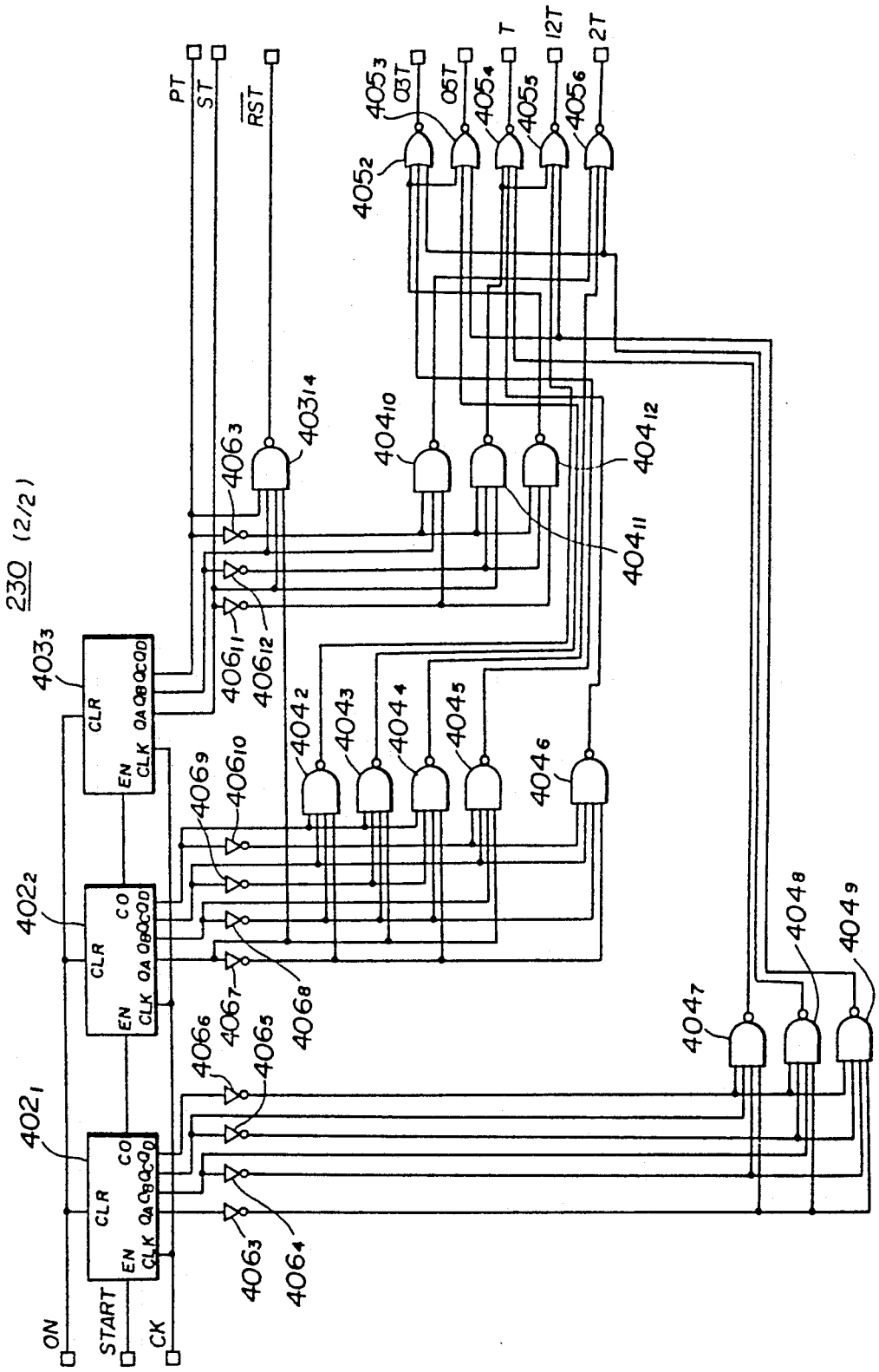

FIGS. 37A and 37B show an embodiment of the timing signal generator 230. The timing signal generator 230 comprises D-type flip-flops $400_1$ through $400_3$, a 4-bit binary counter 401, synchronous 4-bit counters $402_1$ through $402_3$, AND gates $403_1$ through $403_5$, NAND gates $404_1$ through $404_{12}$, NOR gates $405_1$ through $405_6$, and inverters $406_1$ through $406_{13}$ which are connected as shown.

Figure 38:
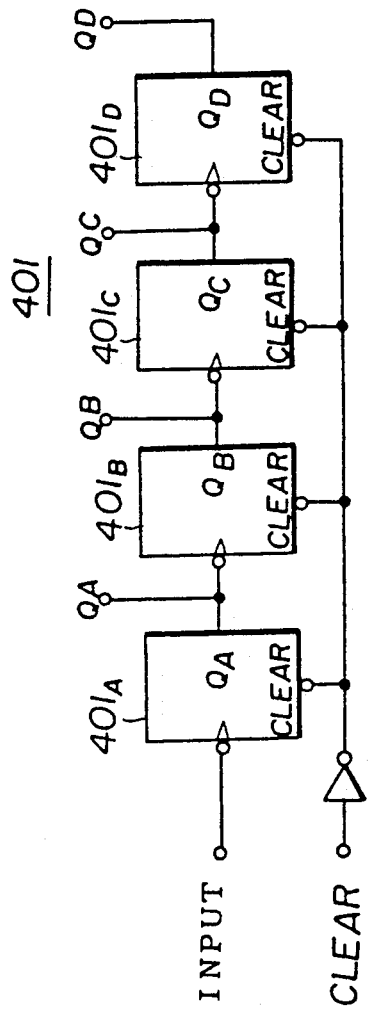
FIG. 38 is a circuit diagram showing an embodiment of a binary counter in the circuit shown in FIG. 37A.

The 4-bit binary counter 401 may be constituted by counters $401_A$ through $401_D$ and an inverter as shown in FIG. 38. In FIG. 38, those parts which are the same as those corresponding parts in FIGS. 37A and 37B are designated by the same reference characters.

Figure 39:
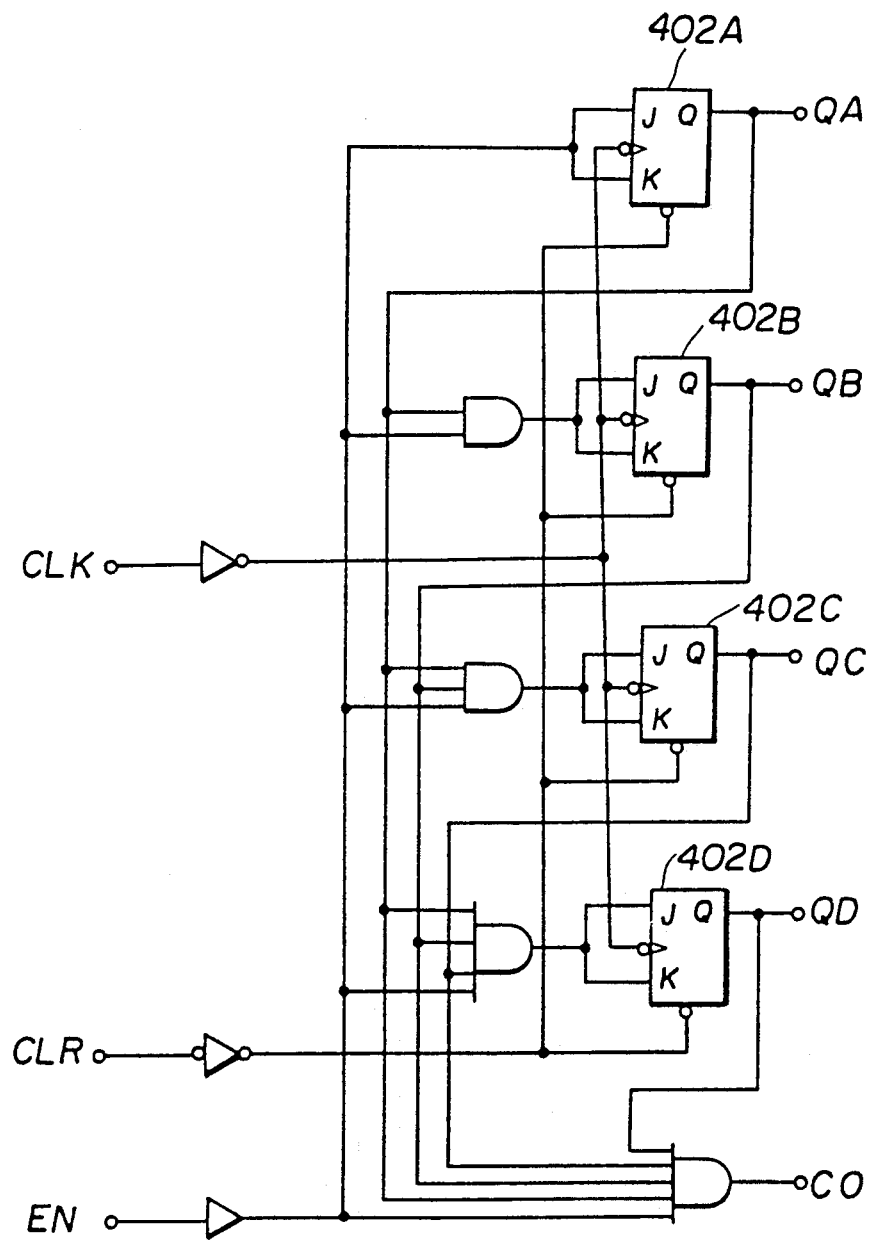
FIG. 39 is a circuit diagram showing an embodiment of a synchronous counter in the circuit shown in FIG. 37B.

As shown in FIG. 39, each of the synchronous 4-bit counters $404_1$ through $404_3$ may be constituted by JK flip-flops $402_A$ through $402_D$, NAND gates and inverters. In FIG. 39, those parts which are the same as those corresponding parts in FIGS. 37A and 37B are designated by the same reference characters.

The sampling pulse generator 231 is supplied with the clock pulse signal CK, the output signals 03T, 2T and $\overline{RST}$ of the timing signal generator 230 and an output signal $\overline{FAIL}$ of the flip-flop 232, and generates the sampling pulse signals SP1 and SP2. The sampling pulse signal SP1 is used to sample and hold the level of the pilot signal $f_P$ (f1) reproduced by the head from the track located on one side of the home track, while the sampling pulse signal SP2 is used to sample and hold the level of the pilot signal $f_P$ (f1) reproduced by the same head from the track located on the other side of the home track.

Figure 40:
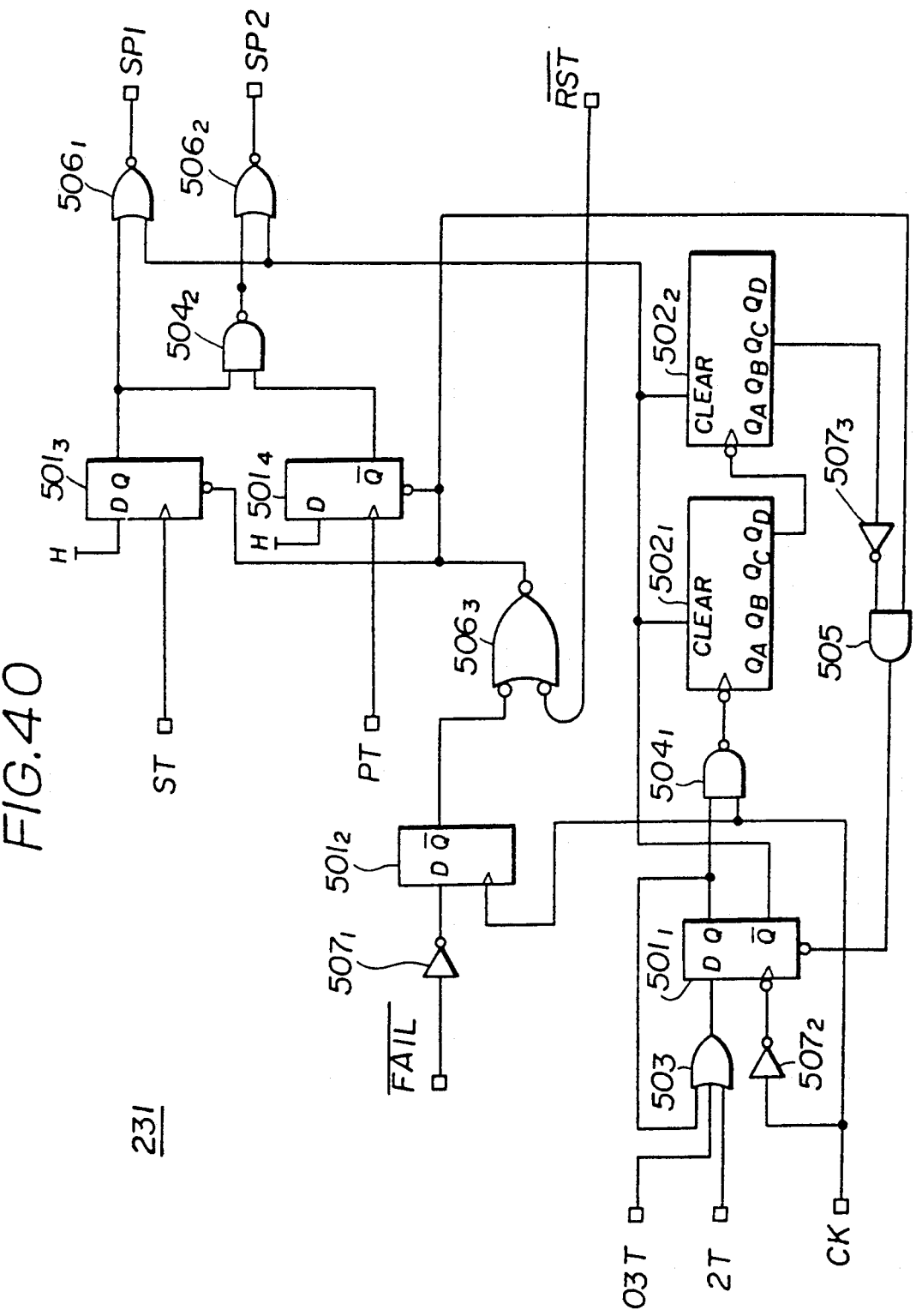
FIG. 40 is a circuit diagram showing an embodiment of a sampling pulse generator in the block system shown in FIG. 31.

FIG. 40 shows an embodiment of the sampling pulse generator 231. The sampling pulse generator 231 comprises D-type flip-flops $501_1$ through $501_4$, 4-bit counters $502_1$ and $502_2$, and OR gate 503, NAND gates $504_1$ and $504_2$, and AND gate 505, NOR gates $506_1$ through $506_3$, and inverters $507_1$ through $507_3$ which are connected as shown. In FIG. 40, those parts which are the same as those corresponding parts in FIG. 31 are designated by the same reference characters.

FIGS. 33(A) through 33(G) show signal waveforms for the case where no signal dropout occurs. FIG. 33 (A) shows the output signal $\overline{FAIL}$ of the flip-flop 232, FIG. 33 (B) shows the output signal length detection signal SL of the signal length detecting circuit 228, FIGS. 33(C) and 33 (D) respectively show the output signals RG1 and RG2 of the registers 229a and 229b, FIG. 22(E) shows an output frame detection signal FS of the flip-flop 236, and FIGS. 33(F) and 33(G) respectively show the output sampling pulse signals SP1 and SP2 of the sampling pulse generator 231. The frame detection signal FS indicates whether the track being reproduced relates to an even frame in which the length synchronizing signal $f_S$ is 0.5 block or to an odd frame in which the length of the synchronizing signal $f_S$ is one block. As may be seen from FIGS. 33 (A) through 33(G), the signal length detection signal SL is outputted in synchronism with the selected synchronizing signal $f_S$, and for this reason, the state of the output signal $\overline{\text{FAIL}}$ of the flip-flop 232 remains unchanged. The sampling pulse generator 231 generates the sampling pulse signals SP1 and SP2 in synchronism with the signal length detection signal SL, that is, the length of the selected synchronizing signal $f_S$. The sampling pulse signal SP2 is synchronized to rising edges of the signals RG1 and RG2.

Figures 32, 33, 34:
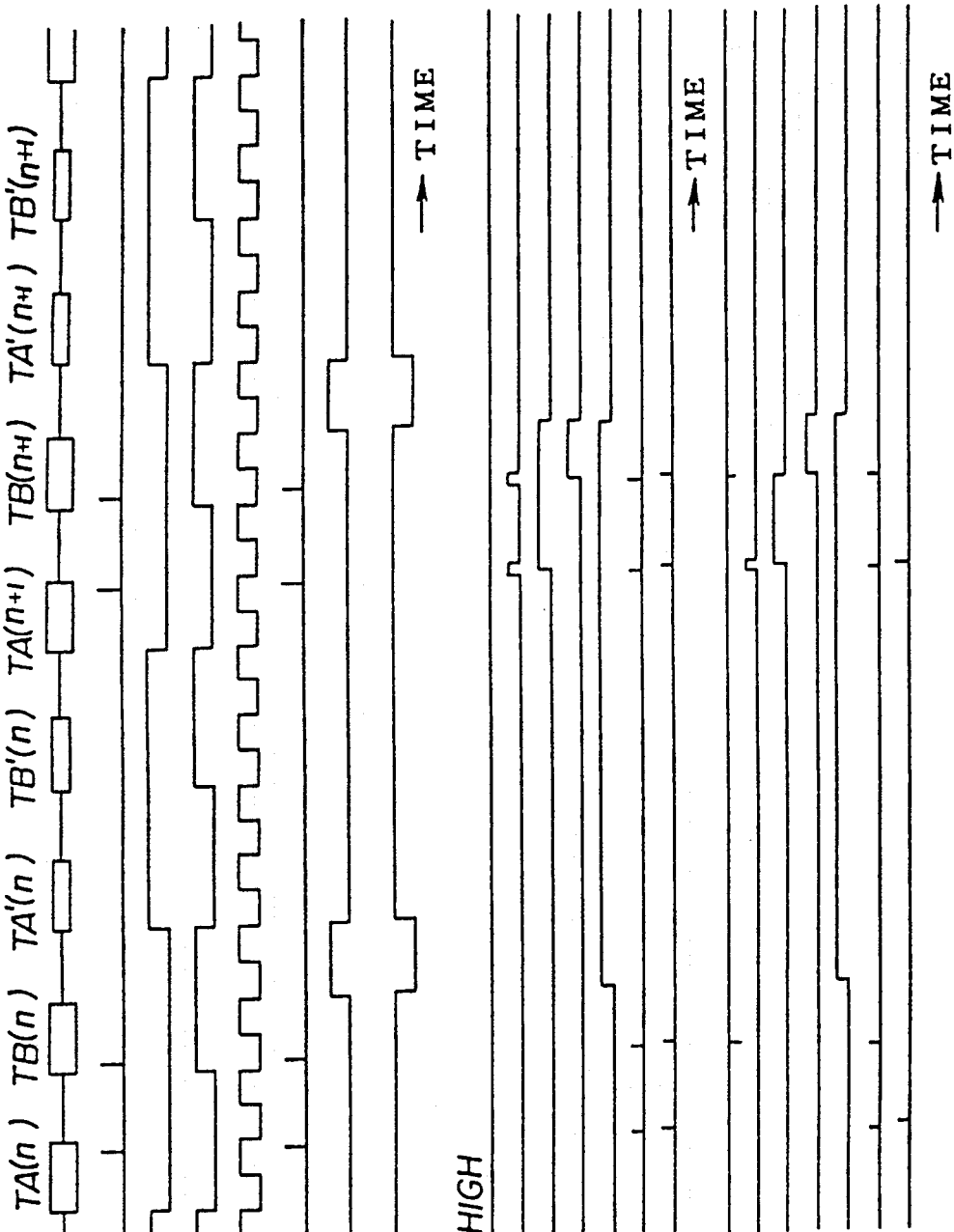
FIGS. 32(A) through 32(H), FIGS. 33(A) through 33(G) and FIGS. 34(A) through 34(G) show timing charts for explaining the operation of the block system shown in FIG. 31.

On the other hand, FIGS. 34(A) through 34 (G) show signal waveforms for the case where a signal dropout occurs. In FIGS. 34(A) through 34(G), the same designations are used as in FIGS. 33(A) through 33(G). In this case, the signal length detection signal SL does not become identical to that of the case described above. For this reason, the state of the output signal $\overline{\text{FAIL}}$ of the flip-flop 232 changes from that of the case described above, and the sampling pulse generator 231 generates the sampling pulse signal SP1 having a predetermined frequency, and the sampling pulse signal SP2 is generated only in synchronism with the rising edge of the signal RG1.

In other words, when a correct signal length detection signal SL cannot be obtained due to the signal dropout, no new sampling pulse signal SP2 is generated. Instead, the sampling pulse signal SP2 at a time immediately before the occurrence of the signal dropout is used, and the error signal from the subtracting circuit 208 is sampled in the S/H circuit 207 responsive to this sampling pulse signal SP2.

Therefore, even when a signal dropout occurs, the ATF signal at a time immediately before the occurrence of the signal dropout continues to be outputted from the S/H circuit 207, and it is thus possible to always carry out a stable tracking control operation. It is thus possible to reproduce from the tape MT which has be recorded in the conventional half-speed mode PCM audio data of an extremely high quality in the half-speed mode of the present invention which provides the long play time compared to the standard mode.

Further, the present invention is not limited to these embodiments, but various variations and modifications may be made without departing from the scope of the present invention.

What we claim is:

1. A rotary head type digital signal reproducing apparatus for playing a magnetic tape pre-recorded with a time division multiplexed signal in one of first and second modes, said time division multiplexed signal comprising pulse code modulated audio data which is obtained by subjecting an original audio signal to a pulse code modulation and a tracking reference signal, said tracking reference signal which amounts to a predetermined time period being time division multiplexed before and after said pulse code modulated audio data which amounts to a certain time period, said time division multiplexed signal being recorded on successive tracks formed obliquely to a longitudinal direction of the magnetic tape by two rotary magnetic heads, during the recording in said second mode, a data quantity per unit time, a frequency of said tracking reference signal, a rotational speed of the rotary magnetic heads and a tape transport speed of the magnetic tape being one-half those in said first mode, said rotary head type digital signal reproducing apparatus comprising:

reproducing means including two rotary magnetic heads for reproducing pre-recorded signals from the magnetic tape;

means for setting the tape transport speed to a speed identical to that in said second mode and for setting the rotational speed of the rotary magnetic heads to a speed identical to that in said first mode when playing the magnetic tape pre-recorded in said second mode; and tracking control means for controlling tracking of the rotary magnetic heads based on reproduced tracking reference signals reproduced by said reproducing means, said reproduced tracking reference signals including out of reproduced signals obtained from said reproducing means during successive first through fourth scans made by the rotary magnetic heads with respect to two mutually adjacent tracks on the magnetic tape a reproduced tracking reference signal obtained in an end portion of said first scan and a reproduced tracking reference signal obtained in a beginning portion of said second scan immediately after said first scan, said first and second scans being successive scans in which a large reproduced output is obtainable by the rotary magnetic heads from said two mutually adjacent tracks compared to said third and fourth scans.

2. A rotary head type digital signal reproducing apparatus as claimed in claim 1 in which said tracking reference signal of the time division multiplexed signal comprises at least a pilot signal and a synchronizing signal, said synchronizing signal having one of first and second frequencies with one of first and second signal lengths so that the synchronizing signal frequency is different between the two mutually adjacent tracks on the magnetic tape and the synchronizing signal has mutually different combinations of the frequency and signal length in four successive tracks on the magnetic tape, said tracking control means comprising separating means for separating the pilot signal and the synchronizing signal from a reproduced signal obtained from said reproducing means, detecting means for detecting the frequency and signal length of the separated synchronizing signal received from said separating means and for generating timing signals dependent on the detected frequency and signal length, and means for producing an error signal indicative of a tracking error quantity by comparing levels of two pilot signals which are reproduced from both sides of a track scanned by said reproducing means and sampled and held responsive to said timing signal.

3. A rotary head type digital signal reproducing apparatus as claimed in claim 2 in which said detecting means comprises a counter supplied with the separated synchronizing signal from said separating means, and a signal length detecting circuit for detecting the signal length of the separated synchronizing signal based on an output signal of said counter and for outputting a signal length detection signal indicative of the detected signal length.

4. A rotary head type digital signal reproducing apparatus as claimed in claim 3 in which said detecting means further comprises circuit means for detecting said different combinations of the frequency and signal length of the separated synchronizing signal based on the signal length detection signal from said signal length detecting circuit, and a sampling pulse generator for generating sampling pulse signals for sampling and holding the level of said two pilot signal responsive to the combination detected in said circuit means.

* * * * *